US012542033B2

(12) United States Patent
Uchida et al.

(10) Patent No.: US 12,542,033 B2
(45) Date of Patent: Feb. 3, 2026

(54) MEDAL GAME MACHINE

(71) Applicant: SEGA CORPORATION, Tokyo (JP)

(72) Inventors: Tsutomu Uchida, Tokyo (JP); Takao Fukuoka, Tokyo (JP); Daisuke Suzuki, Tokyo (JP); Kouhei Hashimoto, Tokyo (JP); Nobuyuki Iwasaki, Tokyo (JP); Yusuke Masunaga, Tokyo (JP); Hirotaka Yoshimatsu, Tokyo (JP); Jun Takenaka, Tokyo (JP); Ikuko Higashiyama, Tokyo (JP); Seiya Sumi, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 494 days.

(21) Appl. No.: 17/902,377

(22) Filed: Sep. 2, 2022

(65) Prior Publication Data

US 2023/0075872 A1 Mar. 9, 2023

(30) Foreign Application Priority Data

Sep. 6, 2021 (JP) ................................ 2021-144819

(51) Int. Cl.
*G07F 17/32* (2006.01)

(52) U.S. Cl.
CPC ...... *G07F 17/3297* (2013.01); *G07F 17/3216* (2013.01)

(58) Field of Classification Search
CPC ...... G07F 1/06; G07F 11/005; G07F 17/3297; G07F 17/3216
See application file for complete search history.

(56) References Cited

U.S. PATENT DOCUMENTS 4,662,636 A * 5/1987 Crompton ........... G07F 17/3297 273/138.2
5,275,402 A * 1/1994 Malavazos .......... G07F 17/3297 273/138.2

(Continued)

FOREIGN PATENT DOCUMENTS

CN 209149474 U * 7/2019
CN 109243102 B * 11/2023 ......... G07F 17/3216

(Continued)

OTHER PUBLICATIONS

JP2010125279A (Year: 2010).*

(Continued)

*Primary Examiner* — Eugene L Kim
*Assistant Examiner* — Amir A Klayman
(74) *Attorney, Agent, or Firm* — Sterne, Kessler, Goldstein & Fox P.L.L.C.

(57) ABSTRACT

A medal game machine capable of improving a degree of satisfaction of a player with a medal game and enjoyment of the medal game by performing: forming of the medal tower, pushing of the medals, and feeding of medals do not affect each other and are visible to the player. A medal game machine includes a medal feeder that receives medals supplied from the outside of the medal game machine and feeds the medals into a first area; a placement surface on which medals are placed; a pusher table that moves the medals placed on the placement surface; a medal tower forming device that forms one medal tower having one or more layers at a predetermined position each time; and a transporter that transports the one medal tower formed at the predetermined position to the placement surface. When the placement surface is viewed in a plan view, the placement surface and the pusher table are in the first area and the predetermined position is in a second area outside the first (Continued)

area. The medal tower forming device forms medal towers that are visible from the outside of the medal game machine.

6 Claims, 12 Drawing Sheets

(56) References Cited

U.S. PATENT DOCUMENTS

| | | | | |
|---|---|---|---|---|
| 5,462,286 A * | 10/1995 | Roberts | A63F 9/00 | 273/459 |
| 5,507,490 A * | 4/1996 | Hagiwara | G07F 17/3297 | 463/16 |
| 5,553,865 A * | 9/1996 | Shoemaker, Jr. | A63F 7/0058 | 221/209 |
| 5,713,572 A * | 2/1998 | Hagiwara | G07F 17/3297 | 273/138.3 |
| 6,264,197 B1 * | 7/2001 | Halliburton | G07F 17/3297 | 273/138.2 |
| 6,629,887 B1 * | 10/2003 | Todaiji | G07F 17/3244 | 463/2 |
| 7,172,197 B2 * | 2/2007 | Wilson | G07F 17/3297 | 273/288 |
| 7,559,552 B2 * | 7/2009 | Shoemaker, Jr. | G07F 17/3297 | 273/138.3 |
| 7,934,723 B2 * | 5/2011 | Sasaki | A63F 9/00 | 273/138.2 |
| 7,971,880 B2 * | 7/2011 | Niwa | G07F 17/3297 | 273/138.3 |
| 9,754,456 B2 * | 9/2017 | Verstraeten | G07F 17/38 | |
| 2002/0175465 A1 * | 11/2002 | Halliburton | G07F 17/3297 | 273/138.1 |
| 2005/0070352 A1 * | 3/2005 | Hattori | G07F 17/3297 | 463/16 |
| 2009/0061979 A1 * | 3/2009 | Okuaki | G07F 17/3297 | 463/16 |
| 2010/0044960 A1 * | 2/2010 | Nagayama | A63F 7/00 | 273/138.3 |

FOREIGN PATENT DOCUMENTS

| | | | |
|---|---|---|---|
| GB | 2114452 A * | 8/1983 | A63F 11/00 |
| JP | 2001-029643 | 2/2001 | |
| JP | 3676297 | 7/2005 | |
| JP | 3124874 U * | 8/2006 | |
| JP | 2009125134 A * | 6/2009 | |
| JP | 2009-201641 | 9/2009 | |
| JP | 2010125279 A * | 6/2010 | |
| JP | 2010252870 A | 11/2010 | |
| JP | 2013039314 A * | 2/2013 | |
| JP | 5242424 B2 * | 7/2013 | |
| JP | 2013141540 A * | 7/2013 | |

OTHER PUBLICATIONS

JP2013141540A (Year: 2013).*
JP5242424B2 (Year: 2013).*
JP 3124874 U (Year: 2006).*
JP 2013039314 A (Year: 2013).*
JP 2009125134 A (Year: 2009).*
CN 209149474 U (Year: 2019).*
CN 109243102 B (Year: 2023).*
Notice of Reasons for Refusal from priority Japanese patent application No. 2021-144819, dated Aug. 14, 2024, and machine translation, 7 pages.
Decision to Grant from priority Japanese patent application No. 2021-144819, dated Oct. 23, 2024, and machine translation, 6 pages.

* cited by examiner

MEDAL GAME MACHINE

BACKGROUND

Field

The present invention relates to a medal game machine.

Description of Related Art

Currently, a medal game machine configured to push and drop medals and a medal tower using a pusher that reciprocates in a game area due to a player feeding medals into the game area and forming a medal tower in the game area, and that pays out the dropped medals to the player is known. For example, JP-B 3676297 discloses a medal game machine that allows playing of a medal feeding game and a medal pushing game on a placement surface in one game area, while playing of a medal tower forming game in an invisible place below the placement surface. With such a medal game machine, it is possible to curb interference of a configuration on the placement surface and improve a degree of freedom in design.

SUMMARY

However, because a conventional medal game machine of the related art disclosed in JP-B 3676297 plays each of a medal pushing game and a medal feeding game in a medal acquisition game, and a medal tower forming game in the same game area, a medal tower forming process is susceptible to movement of medals in the medal pushing game and feeding of medals in the medal feeding game. Further, because forming of the medal tower is performed in an invisible state, it is difficult for a player to ascertain a progress state of a medal forming game. As a result, a degree of satisfaction of the player with the medal game may be decreased.

The present invention has been made in view of such circumstances, and an object of the present invention is to provide a medal game machine capable of improving a degree of satisfaction of a player with a medal game and enjoyment of the medal game by performing forming of the medal tower, pushing of the medals, and feeding of medals do not affect each other and are visible to the player In order to achieve the above object, a medal game machine according to the present invention includes a medal feeder configured to receive medals supplied from outside of the medal game machine and feed the medals into a first area; a placement surface on which medals are placed; a pusher table configured to move the medals placed on the placement surface; a medal tower forming device configured to form one medal tower having one or more layers at a predetermined position each time; and a transporter configured to transport the one medal tower formed at the predetermined position to the placement surface, wherein when the placement surface is viewed in a plan view, the placement surface and the pusher table are in the first area and the predetermined position is in a second area outside the first area, wherein the medal tower forming device forms medal towers that are visible from the outside of the medal game machine.

With such a configuration, the medal acquisition game and the medal tower forming game in the medal game can be played without affecting each other. Specifically, it is possible to prevent an unfinished medal tower from collapsing due to the feeding of medals and the movement of the pusher table during the medal acquisition game by playing the medal acquisition game and the medal tower forming game in different areas. Therefore, it is not necessary to stop the feeding of the medals and the movement of the pusher table during a process of forming the medal tower, and it is possible to perform the medal tower forming game in parallel with the medal acquisition game. Therefore, it is possible to shorten a waiting time for medal tower forming, to realize elimination of stress of the player due to the inability to play the medal acquisition game during the waiting time, and to play the medal game at a good tempo. At the same time, it becomes easier for the player to confirm a formed state of the medal tower and it is possible to arouse a player's desire to form a higher medal tower, by making the forming of the medal tower visible from the outside of the medal game machine. As a result, it is possible to improve a degree of satisfaction of the player with the medal game and enjoyment of the medal game.

In the medal game machine according to the present invention, a height of the predetermined position may be the same as a height of the placement surface, and the transporter may transport the medal tower from the predetermined position to the placement surface by moving the medal tower horizontally.

By adopting such a configuration, it is possible to easily realize transport of the medal tower, and to maintain the medal tower in a stable state during transport.

In the medal game machine according to the present invention, the transporter may include an extruder capable of moving horizontally back and forth between the first area and the second area, and configured to push one medal tower from the predetermined position to the placement surface by coming into contact with the one medal tower, the pusher table may move horizontally in a first direction with respect to the placement surface, the extruder may move horizontally in a second direction with respect to the placement surface, and the first direction and the second direction may intersect.

With such a configuration, it is possible to realize transport of the medal tower by using a simple configuration, to reduce a dimension of the medal game machine in a moving direction of the pusher table as compared with a case in which the pusher table and the extruder are arranged side by side, by arranging the pusher table and the extruder so that moving directions thereof intersect, and to achieve a small size of the medal game machine.

The medal game machine according to the present invention may further include a controller configured to control the medal feeder and the pusher table, wherein the controller may enable feeding of medals into the first area by the medal feeder and movement of the pusher table during a form process in which the medal tower forming device forms one medal tower or in a state in which one medal tower is placed at the predetermined position; and stop the feeding of medals into the first area by the medal feeder and the movement of the pusher table during a transport process in which the transporter transports one medal tower formed at the predetermined position to the placement surface.

With such a configuration, the medal pushing game can simultaneously progress in the process of forming the medal tower, and when the completed medal tower is transported, the collapse of the medal tower due to the progress of the medal pushing game can be avoided.

In the medal game machine according to the present invention, a predetermined placement position for placing the medal tower may be formed on the placement surface, the transporter may include an extruder configured to push the medal tower from the predetermined position to the placement position by coming into contact with the medal tower, the controller may enable the feeding of medals into the first area by the medal feeder and the movement of the pusher table in a standby state in which the extruder is located outside the first area without contacting with the medal tower; and stop the feeding of medals into the first area by the medal feeder and/or the movement of the pusher table during a transport process from a time when the extruder comes into contact with one medal tower at the predetermined position and starts to move the one medal tower toward the placement position to a time when the extruder finishes moving the one medal tower to the placement position, and during an exit process from a time immediately after the transport process is performed to a time when the extruder exits from the first area.

With such a configuration, it is possible to curb collapse of the medal tower during transport or the damage of the extruder during the exit due to the feeding of the medals, and to shorten a stop time of the medal pushing game by stopping the medal pushing game only in the process of transporting the medal tower using the extruder and the process of exiting the extruder.

In the medal game machine according to the present invention, the controller may enable the medal feeder to receive medals supplied from the outside of the medal game machine in the transport process and the exit process, and calculate the number of medals received by the medal feeder in the transport process.

With such a configuration, even when the medal pushing game is temporarily stopped, it is possible for the player to put medals into the medal feeder, and to improve a degree of freedom of the player.

In the medal game machine according to the present invention, the medal feeder may include an feeding operator operated by a player, a predetermined placement position for placing the medal tower may be formed on the placement surface, the transporter may include an extruder configured to push the medal tower from the predetermined position to the placement position by coming into contact with the medal tower, an exit process of exiting the extruder from the first area may be performed immediately after the transport process is performed, and the controller may control the medal feeder so that the medal feeder does not feed the medal into the first area even when the feeding operator is operated in the transport process and the exit process.

With such a configuration, it is possible to reliably avoid the collapse of the medal tower due to the feeding of medals.

According to the present invention, it is possible to provide a medal game machine capable of improving a degree of satisfaction of a player with a medal game and enjoyment of the medal game by performing forming of the medal tower, pushing of the medals, and feeding of medals do not affect each other and are visible to the player.

DETAILED DESCRIPTION

Figure 1:
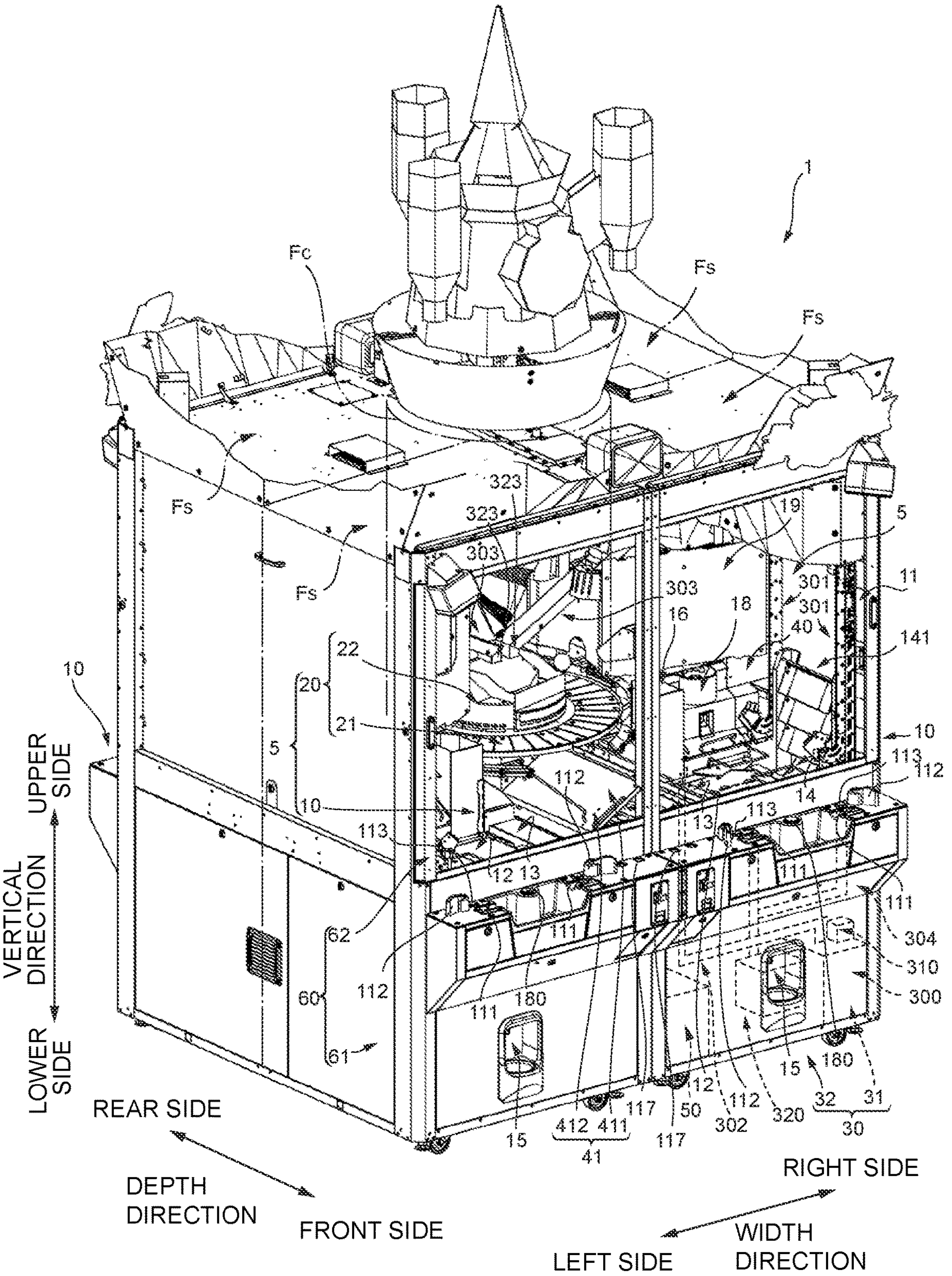
FIG. 1 is a perspective view illustrating a configuration of a medal game machine according to the present embodiment.

Hereinafter, the present embodiment will be described with reference to respective figures. Positional relationships such as above, downward, left, and right in the drawings are assumed to be based on positional relationships illustrated in the drawings unless otherwise specified. Further, dimensional ratios in the drawings are not limited to the ratios illustrated in the drawings. Further, the following embodiment is examples illustrating the present invention, and the present invention is not intended to be limited only to this embodiment. Furthermore, the present invention can be modified in various ways as long as the modification does not depart from the gist of the present invention.

Overview of Medal Game Machine 1

Figure 2:
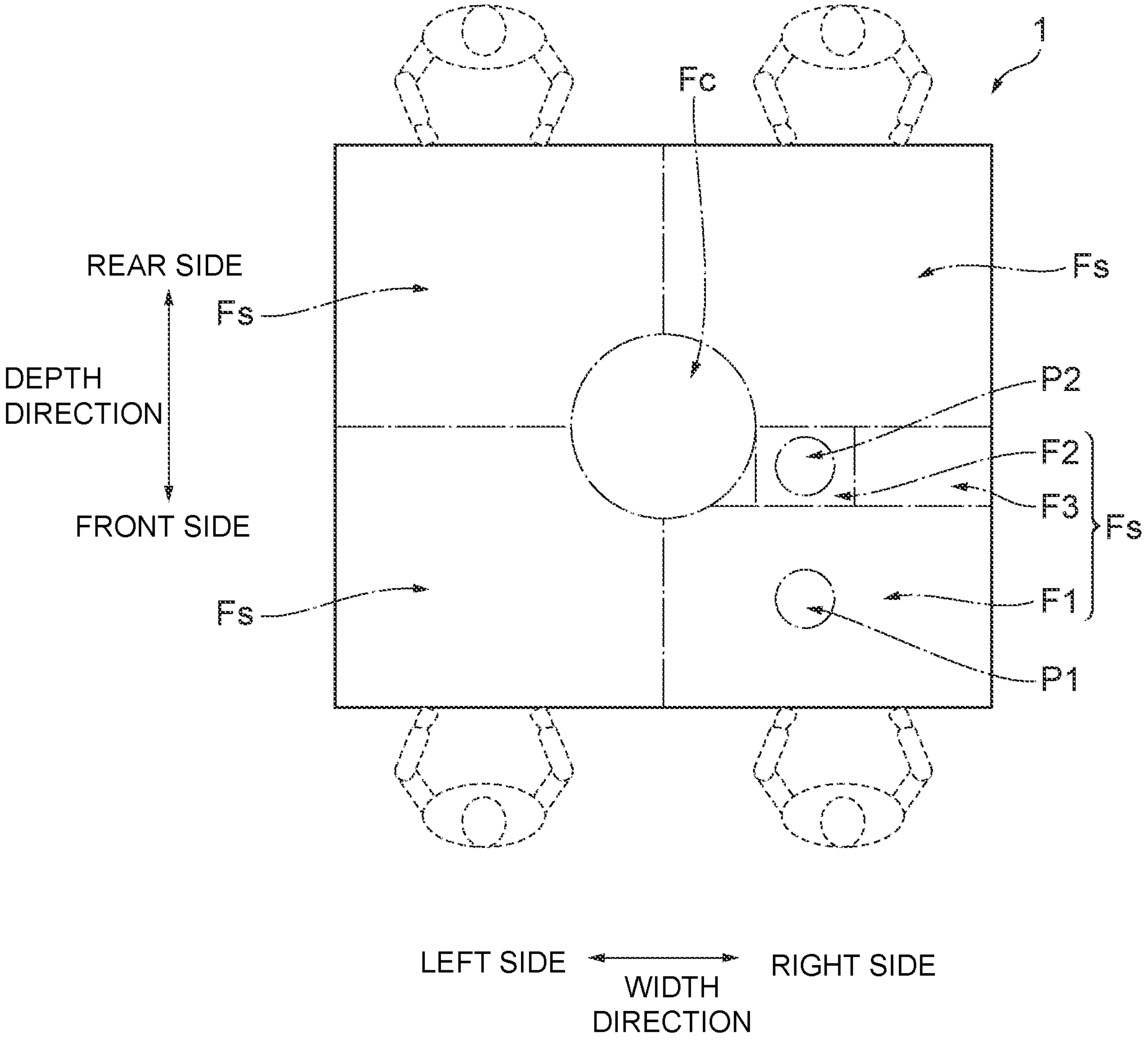
FIG. 2 is a plan view illustrating each area of the medal game machine according to the present embodiment.

First, an overview of the configuration of the medal game machine 1 according to the present embodiment will be described with reference to FIGS. 1 to 5, and then, the medal game played using the medal game machine 1 will be described. FIG. 1 is a perspective view of the medal game machine 1. FIG. 2 is a plan view illustrating each area of the medal game machine 1. Each area illustrated in FIG. 2 is a three-dimensional space.

Overview of Configuration

The medal game machine 1 according to the present embodiment is an example of a game device in which a plurality of players can play their own medal games at the same time. The number of players that can use the medal game machine 1 is four. As illustrated in FIGS. 1 and 2, the medal game machine 1 includes four game areas Fs in which a configuration used independently by each player (a first medal game machine 10 to be described below, or the like) is disposed, and one game area Fc in which a configuration (a second medal game machine 20 to be described below) that is shared and used with other players by each player is disposed. The game area Fc is formed at a center of the medal game machine 1. The four game area Fs are formed around the game area Fc to surround the game area Fc.

Further, as illustrated in FIG. 1, the medal game machine 1 includes a first medal game machine 10 provided in each game area Fs and a second medal game machine 20 provided in the game area Fc. The first medal game machine 10 provided in each game area Fs and the second medal game machine 20 are configured for each player to play his or her own medal game. The second medal game machine 20 rotates so that each of four players can use the second medal game machine 20 in a predetermined order. Further, when one player is using the second medal game machine 20, the rotation of the second medal game machine 20 is stopped, and in this case, another player cannot use the second medal game machine 20. Hereinafter, the first medal game machine 10 and the second medal game machine 20 used by each player to play his or her own medal game may be collectively referred to as "game machine 5".

Further, as illustrated in FIG. 1, the medal game machine 1 includes a medal supply portion 30 provided in each game area Fs and supplying medals to the corresponding game machine 5, a ball supply portion 40 that is provided in each game area Fs and supplies balls to the corresponding game machine 5, a controller 50 that is provided in each game area Fs and controls the corresponding game machine 5, the medal supply portion 30, and the ball supply portion 40, and a housing 60 that supports and accommodates the game machine 5, the medal supply portion 30, the ball supply portion 40, and the controller 50.

The medal supply portion 30 includes a first medal supply portion 31 that can perform medal circulation between respective internal configurations of the medal game machine 1 and supply medals to be used for a medal game, and a second medal supply portion 32 that can perform medal circulation between the medal game machine 1 and the player and supply the medals to the player. The first medal supply portion 31 and the second medal supply portion 32 are independent paths. In other words, the medals used by the player and the medals used in the medal game are separate. Thus, it is possible to curb an influence of a state change such as dirt on the medals on the medal game.

As illustrated in FIG. 1, the first medal supply portion 31 includes two first medal supply paths 301, a second medal supply path 302, and a third medal supply path 303. The two first medal supply paths 301 are configured to supply medals to two medal feeders 11, which will be described below, of the first medal game machine 10. The second medal supply path 302 is configured to supply medals to the medal tower forming device 16, which will be described below, of the first medal game machine 10. The third medal supply path 303 is configured to supply medals to the center pusher table 22, which will be described below, of the second medal game machine 20.

As illustrated in FIG. 1, the second medal supply portion 32 has a fourth medal supply path 304. The fourth medal supply path 304 is configured to receive the medals inserted by the player, store the medals inside the medal game machine 1, and pay out the medals from the inside of the medal game machine 1 to the outside when the player requests payout of the medals.

Figure 5:
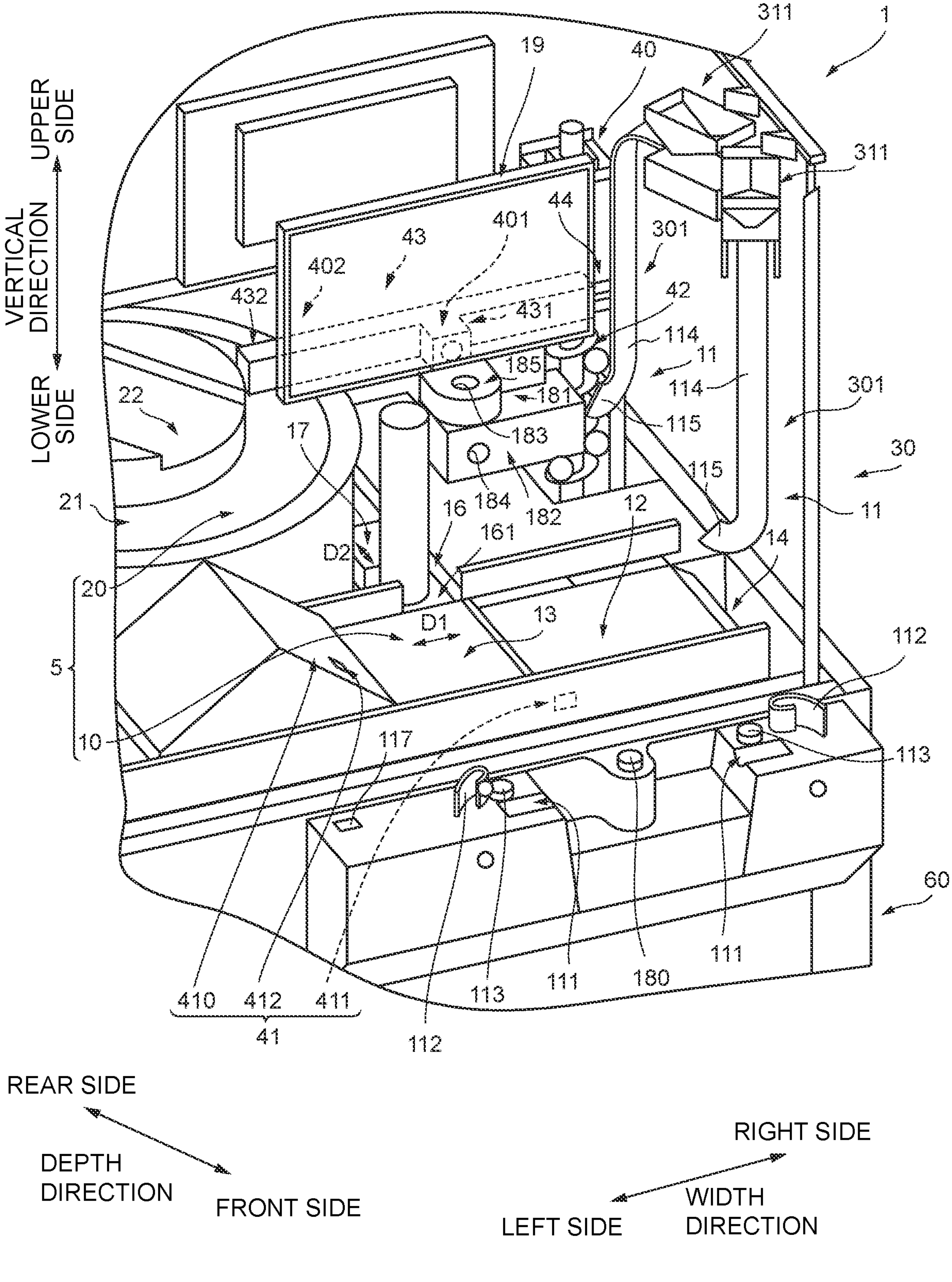
FIG. 5 is a schematic diagram illustrating a configuration of a ball supply portion and a medal supply portion of the medal game machine according to the present embodiment.

The ball supply portion 40 includes a first ball supply path 401 and a second ball supply path 402 (see FIG. 5). The first ball supply path 401 is configured to supply balls to a placement surface 12 or an upper surface of a pusher table 13, which will be described below, of the first medal game machine 10. The second ball supply path 402 is configured to supply balls to a rotation base portion 21, which will be described below, of the second medal game machine 20. The first ball supply path 401 and the second ball supply path 402 include some common configurations. Further, the balls supplied by the first ball supply path 401 and the second ball supply path 402 include a plurality of types of balls having different colors and sizes.

The controller 50 is connected to a memory that stores various types of data and programs. At the time of the game, the controller 50 controls each of the first medal game machine 10, the second medal game machine 20, the medal supply portion 30, and the ball supply portion 40 on the basis of the data and the program stored in the memory.

As illustrated in FIG. 1, the housing 60 includes a base portion 61 and a partition portion 62 provided in the upper portion of the base portion 61. The base portion 61 supports each configuration of the medal game machine 1 and protects each configuration of the medal game machine 1 from an external environment (for example, dust or moisture). The partition portion 62 defines an internal space located on the inner side of the housing 60 of the medal game machine 1, in which a game is played, in a space above the housing 60, and an external space located on the outer side of the housing 60, in which the player performs operations such as inputting of medals or feeding of medals. Further, the partition portion 62 is made of a transparent material. Therefore, the medal game can be played in a state in which the medal game is visible from the outside of the medal game machine 1.

Medal Game

Thus, each configuration of the medal game machine 1 operates on the basis of the control of the controller 50 according to an operation of the player and the medal game is played.

Here, medal games that each player can play include a medal acquisition game, a lottery game, and a medal tower forming game. The medal acquisition game includes a first medal pushing game for pushing a medal and a medal tower on the placement surface 12, which will be described below, and dropping the medal and the medal tower into a drop hole 14, which will be described below, and a medal feeding game for feeding medals toward a target object (for example, a medal tower). The lottery game includes a second medal pushing game for pushing a medal and dropping the medal on the placement surface 12, a ball pushing game for pushing the ball dropped on the placement surface 12 and dropping the ball into the drop hole 14, and a ball lottery game for playing a lottery game corresponding to a type of ball dropped into the drop hole 14. The medal tower forming game includes a game of forming a medal tower according to a lottery result of the ball lottery game, that is, the number of formed layers of the drawn medal tower.

Among the medal games, the medal acquisition game, the ball pushing game and the ball lottery game of the lottery game, and the medal forming game are games that are played by the first medal game machine 10, and the second medal pushing game of the lottery game is a game that is played by the second medal game machine 20. Further, the medals used in the medal acquisition game are provided by the two first medal supply paths 301, the medals used in the medal tower forming game are provided by the second medal supply path 302, the medals and balls used in the second medal pushing game are supplied by the third medal supply path 303 and the second ball supply path 402, and some of the balls used in the ball pushing game and the ball lottery game are supplied by the first ball supply path 401, and the other balls are balls dropped from the rotation base portion 21 of the second medal game machine 20 to the placement surface 12 by the second medal pushing game.

Further, each medal game is played in an area that does not affect the others. Specifically, as illustrated in FIG. 2, each game area Fs includes a first area F1, and a second area F2 and a third area F3 outside the first area F1. The first area F1 is located near a peripheral edge of the medal game machine 1, and the second area F2 and the third area F3 are located away from the peripheral edge of the medal game machine 1 in a depth direction. The first area F1, the second area F2, the third area F3, and the game area Fc are independent areas not interfering with each other. Further, the medal acquisition game is played in the first area F1, the medal tower forming game is played in the second area F2, the ball lottery game is played in the first area F1 and the third area F3, and the second medal pushing game is played in the game area Fc. Therefore, the medal acquisition game and the medal tower forming game can be played at the same time, and the lottery game and the medal acquisition game can be played at the same time. Further, the first medal pushing game and the medal feeding game in the medal acquisition game can be played at the same time.

Details of Medal Game Machine 1

Subsequently, details of an important configuration of the medal game machine 1 according to the present embodiment will be described with reference to FIGS. 1 to 7.

Structure of First Medal Game Machine 10

Figure 3:
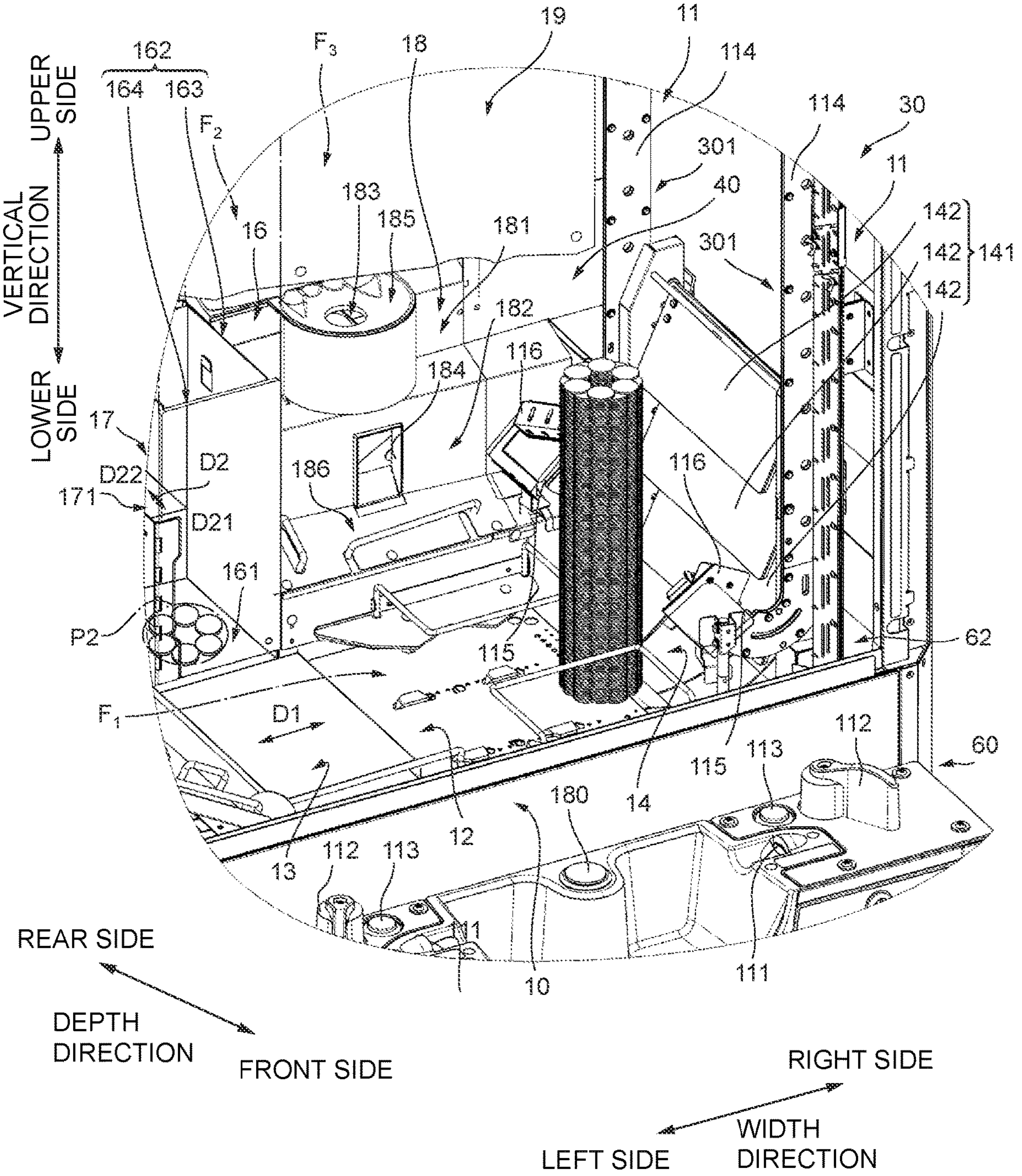
FIG. 3 is a diagram illustrating a configuration of a medal feeder of the medal game machine according to the present embodiment.
Figure 4:
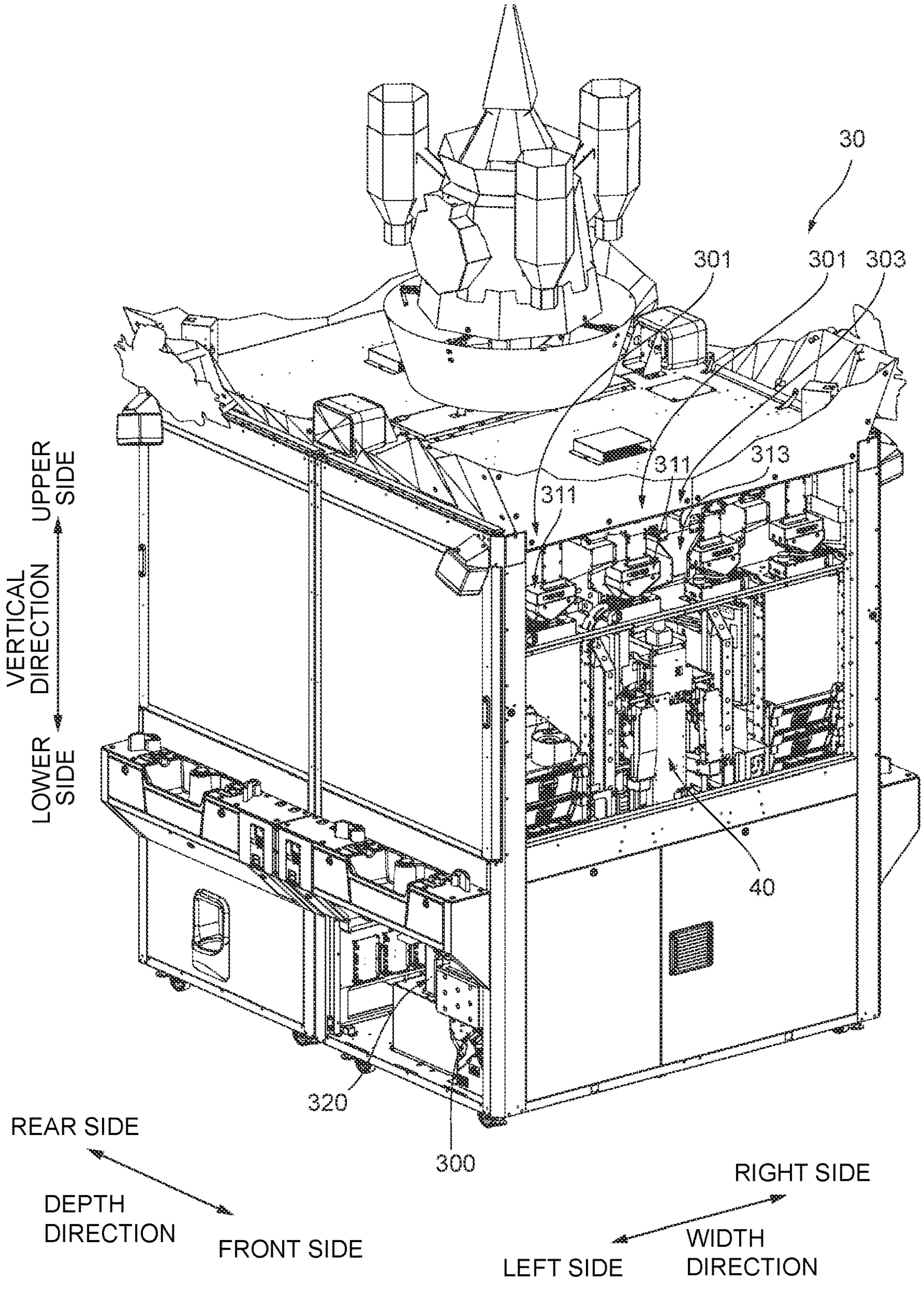
FIG. 4 is a diagram illustrating a configuration of a medal supply portion of the medal game machine according to the present embodiment.
Figure 6A:
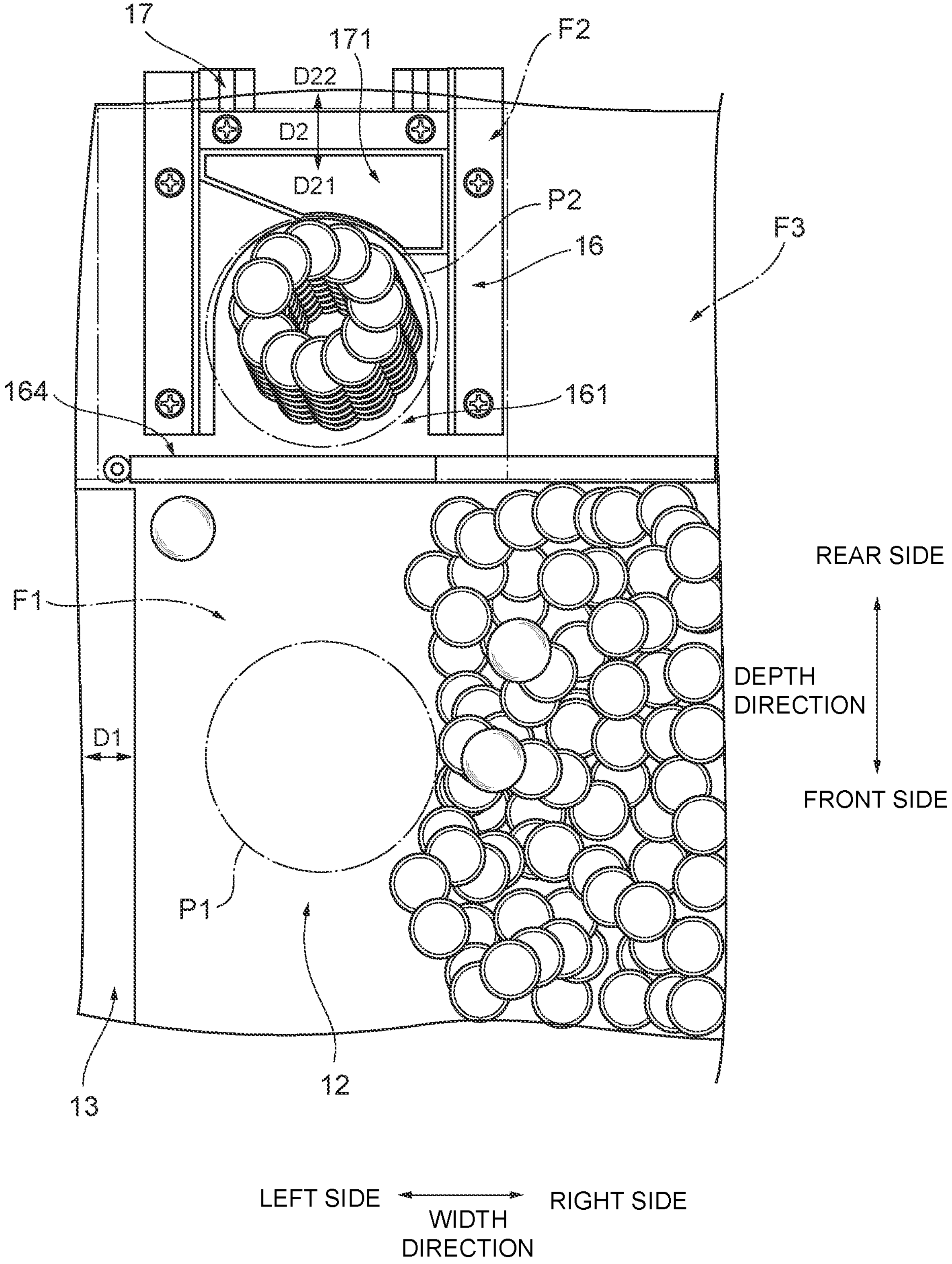
FIG. 6A is a configuration of a transporter of the medal game machine according to the present embodiment.
Figure 6B:
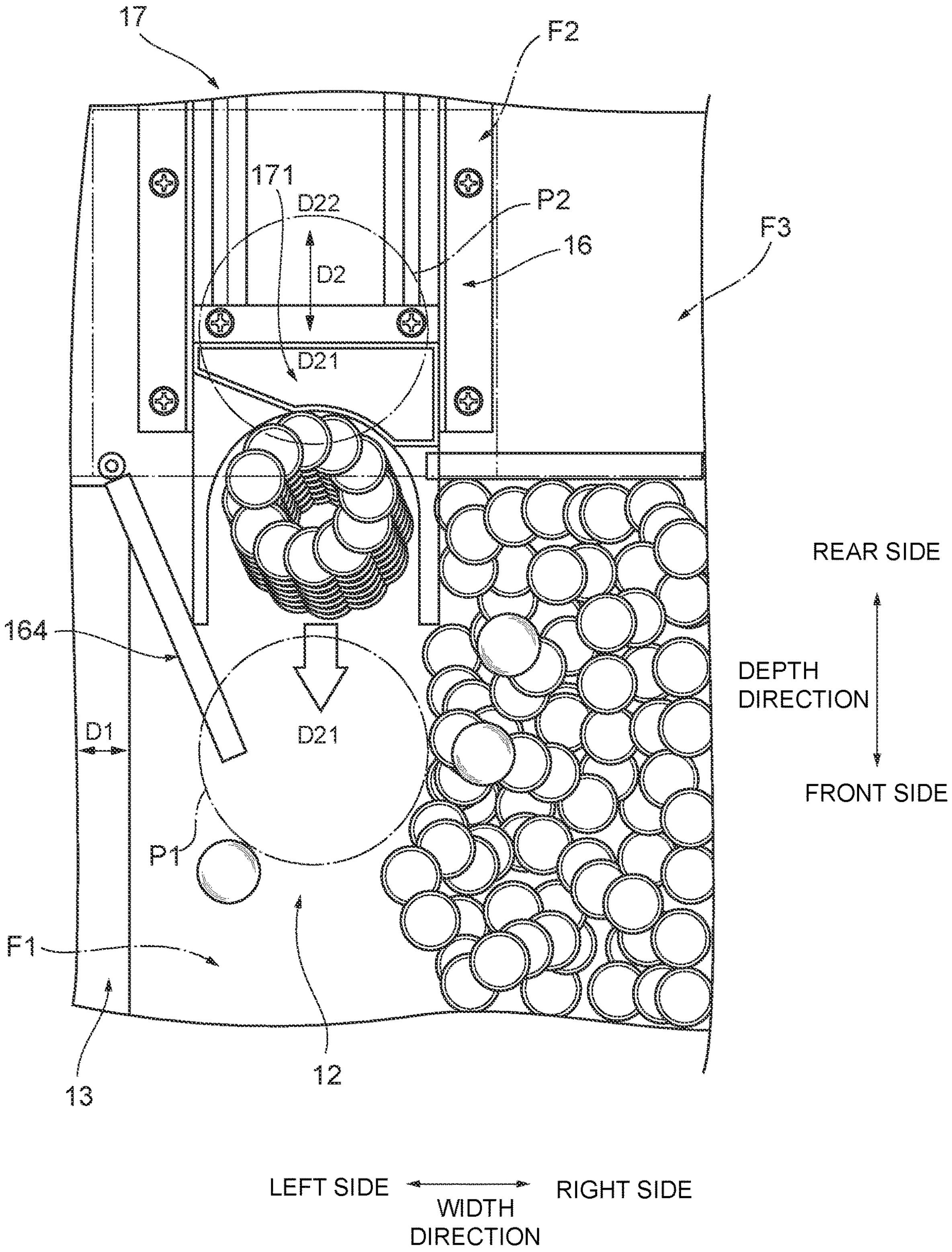
FIG. 6B is a diagram illustrating a transport process of a transporter of the medal game machine according to the present embodiment.
Figure 6C:
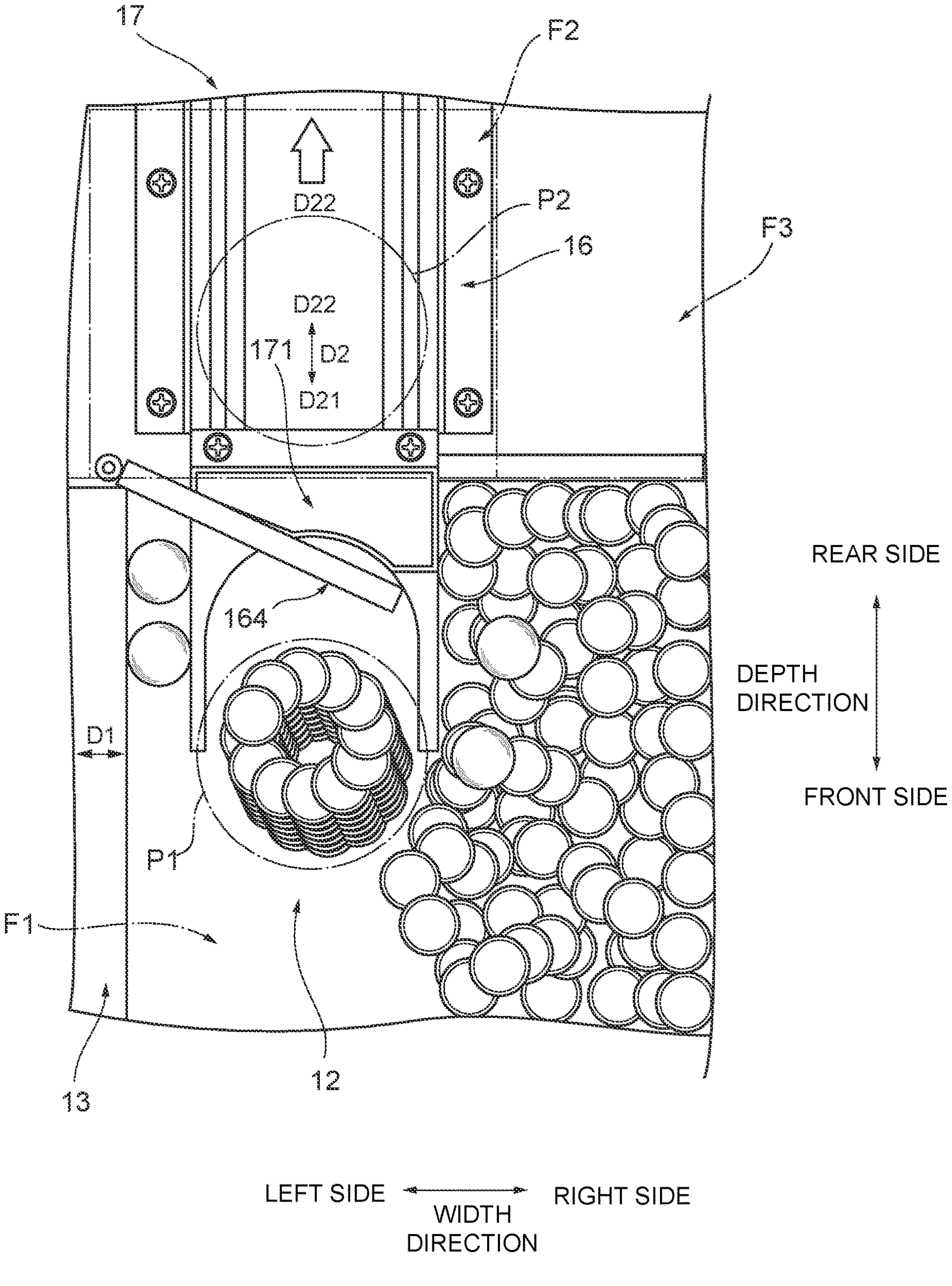
FIG. 6C is a diagram illustrating an exit process of a transporter of the medal game machine according to the present embodiment.

First, a configuration of the first medal game machine 10 will be described with reference to FIGS. 1 to 6C. FIG. 3 is a diagram illustrating a configuration of the medal feeder 11. FIG. 4 is a diagram illustrating a configuration of the medal supply portion 30. FIG. 5 is a schematic view illustrating a partial configuration of the medal supply portion 30 and a configuration of the ball supply portion 40. FIGS. 6A to 6C are diagrams illustrating a configuration and operation of the transporter 17. In the following description, a configuration of one first medal game machine 10 on the right front side among four first medal game machines 10 illustrated in FIG. 1 will be mainly described. In FIGS. 5 to 6C, a display of some configurations is omitted.

As illustrated in FIGS. 1 and 3, the first medal game machine 10 includes two medal feeders 11 that receive medals from the outside and feed the medals into the first area F1, the placement surface 12 on which medals, a medal tower, and balls are placed, the pusher table 13 that moves the medals or the like placed on the placement surface 12, the drop hole 14 on which the medals or the like placed on the placement surface 12 drop, a payout port 15 that pays out medals to the outside, a medal tower forming device 16 that forms one or more layers of medal tower, a transporter 17 that transports the medal tower, a ball processing unit 18 that performs circulation of lottery balls and supply of balls for a medal game, and a display unit 19 that displays content or information of the lottery game and other information to the player.

Here, only the medals paid out to the payout port 15 are medals from the outside received by the medal feeder 11, that is, the medals inserted by the player, that is, the medals supplied by the second medal supply portion 32. On the other hand, the medals fed into the first area F1 by the medal feeder 11 and the medals used by the medal tower forming device 16, that is, the medals used in the medal game are medals stored inside the medal game machine 1 in advance. In other words, the medals to be used in the medal game are the medals supplied by the first medal supply portion 31. Details thereof will be described below.

Medal Feeder 11

The medal feeder 11 has a configuration used for the medal feeding game and is provided in the first area F1. As illustrated in FIG. 3, the medal feeder 11 includes a medal reception port 111 through which medals from the player are received, two adjustment handles 112 that adjusts the feeding direction of medals fed into the first area F1 through the two first medal supply paths 301, an feeding button 113 for operating feeding of a medal stored in a first medal hopper 311, which will described below, into the first area F1, a drop guide rail 114 that guides a dropping direction of the medal, a medal feeding port 115 that causes the medal to fly toward the placement surface 12 or an upper surface of the pusher table 13, an feeding adjustment portion 116 that adjusts a flying state (an angle, a height, a speed, or the like) of the medal, and a payout button 117 for operating payout of the medals to the payout port 15. The adjustment handle 112 and the feeding button 113 are examples of a "feeding operator".

The medal reception port 111, the adjustment handle 112, the feeding button 113, and the payout button 117 are provided in an external area, and the drop guide rail 114, the medal feeding port 115, and the feeding adjustment portion 116 are provided in an internal area. The drop guide rail 114 is provided vertically. The medal feeding port 115 is provided at the lower end of the drop guide rail 114 to face the placement surface 12. The feeding adjustment portion 116 is a plate-shaped member and is provided on the downstream side in a direction in which medals jumped from the medal feeding port 115 and on the upper side of the medal feeding port 115. Further, an installation position (an angle, a height, a distance in a width direction, or the like) of the feeding adjustment portion 116 with respect to the medal feeding port 115 can be changed according to a use state (for example, wear or dirt) of the medal. Thus, the flying state of the medals can be maintained constant, and the stability of the medal feeding can be improved.

Further, the medal reception port 111 in the external area and the drop guide rail 114 in the internal area are not connected. Specifically, the medal reception port 111 is connected to a second main medal hopper 320, which will be described below, in the fourth medal supply path 304. On the other hand, the drop guide rail 114 is connected to the first medal hopper 311, which will be described below, in the first medal supply path 301. Further, the medal reception port 111 is provided with a medal detection sensor (not illustrated) that detects that the medal is fed into the medal reception port 111.

Thus, during the game, when the player inserts a medal into the medal reception port 111, the medal detection sensor detects medal feeding information and transmits the medal feeding information to the controller 50. When the controller 50 receives the medal feeding information, the controller 50 controls an operation of the first medal hopper 311 on the basis of a preset medal feeding scheme. Here, the medal feeding scheme includes two types including a direct feeding scheme (that is, an internal circulation feeding scheme) and a non-direct feeding scheme. The direct feeding scheme is a medal feeding scheme in which, each time the medal detection sensor detects that one medal has been fed into the medal reception port 111, the first medal hopper 311 immediately feeds one of the medals stored in the first medal hopper 311 into the first area F1 under the control of the controller 50.

On the other hand, the non-direct feeding scheme is a medal feeding scheme in which, when the player operates the feeding button 113, one of the medals stored in the player is immediately fed into the first area F1 on the basis of the control of the controller 50. In other words, the non-direct feeding scheme is a medal feeding scheme in which the first medal hopper 311 does not immediately feed one of the medals stored in the first medal hopper 311 into the first area F1 each time the medal detection sensor detects that a medal has been fed into the medal reception port 111. Further, in the non-direct feeding scheme, when the player feeds medals into the medal reception port 111 in a batch in advance, the controller 50 stores the number of fed medals and displays the medals on the display unit 19, and each time the player operates the feeding button 113, one medal is fed into the first area F1 by the first medal hopper 311 while subtracting one from the displayed number of medals.

Placement Surface 12

The placement surface 12 is configured to be used in the medal feeding game and the first medal pushing game. A plan view shape of the placement surface 12 is a rectangular shape. As illustrated in FIG. 3, the placement surface 12 is provided in the first area F1 so that a longitudinal direction thereof is along a width direction of the medal game machine 1. Further, the placement surface 12 can place the medals fed by the medal feeder 11, the medal tower formed by the medal tower forming device 16, and the medals and balls dropped from the second medal game machine 20.

Pusher Table 13

The pusher table 13 has a configuration that is used for the first medal pushing game and the ball pushing game. The pusher table 13 is provided above the placement surface 12 and on one end side of the placement surface 12 in a longitudinal direction in the first area F1. Further, the pusher table 13 can be horizontally moved back and forth in a first direction D1 illustrated in FIG. 3 under the control of the controller 50. The first direction D1 is a direction in a longitudinal direction of the placement surface 12.

Drop Hole 14

The drop hole 14 is configured to be used in a medal acquisition game. The drop hole 14 is provided on the other end side of the placement surface 12 in the longitudinal direction in the first area F1. The medals, medal towers, and balls pushed by the pusher table 13 can be dropped from the placement surface 12 through the drop hole 14. Further, the drop hole 14 is provided with a tower chucker 141 that can be pushed by the medal tower falling into the drop hole 14, and a ball guide portion (not illustrated) that guides a movement of the ball dropped into the drop hole 14.

The tower chucker 141 is provided on the side wall side of the housing 60 facing the placement surface 12 above the drop hole 14. The tower chucker 141 includes three touch plates 142 disposed in a vertical direction. A sensor is provided on each of the three touch plates 142. Thus, when the medal tower falling into the drop hole 14 pushes the touch plate 142, it is possible to acquire a prize corresponding to the touch plate 142 at the highest position among the pushed touch plates 142. Here, when the touch plate 142 at a higher position is pushed, it is possible to a better prize. Therefore, according to tower chucker 141, it is possible to arouse player's desire to form a higher medal tower. Further, prize information acquired by the player is displayed on the display unit 19.

Although a case in which the tower chucker 141 is configured of the three touch plates 142 has been described in the present embodiment, a configuration of the tower chucker 141 is not limited thereto. The tower chucker 141 may be configured of a plurality of height sensors provided in a vertical direction, which are capable of detecting a height of the medal tower, or a configuration including such sensors.

The ball guide portion is provided on the side wall side of the drop hole 14 facing the placement surface 12. The balls dropped into the drop hole 14 can be separated from the medals dropped into the drop hole 14 by the ball guide portion and transported to a ball lift 42 of the ball supply portion 40, which will be described below. The medals dropped into the drop hole 14 are collected by a main medal hopper 300. Further, the ball guide portion is provided with a ball identification sensor (not illustrated). Thus, the ball guide portion guides the movement of the ball, identifies the ball information (that is, colors and sizes of the balls) via the ball identification sensor, and transmits the ball information to the controller 50. On the basis of the received ball information, the controller 50 can determine whether or not to play the lottery game and determine a type of lottery game related to a case in which the lottery game is played.

Payout Port 15

The payout port 15 is configured to be used in the medal acquisition game. As illustrated in FIG. 1, the payout port 15 is provided to penetrate a wall portion of the base portion 61 of the housing 60. Thus, a predetermined number of medals can be paid out from the payout port 15 to the external area side by the second main medal hopper 320 of the second medal supply portion 32, which will be described below.

Medal Tower Forming Device 16

The medal tower forming device 16 has a configuration used in the medal tower forming game. Here, the medal tower according to the present embodiment has one or more layers. Further, each layer of the medal tower is configured of a plurality of medals disposed in a predetermined arrangement.

As illustrated in FIG. 3, the medal tower forming device 16 includes a tower placement surface 161 on which a medal tower being formed and formed is placed, and a transparent protection portion 162 that prevents the medals or balls in the first area F1 (specifically, the placement surface 12 and the upper surface of the pusher table 13) from feeding the second area F2 (specifically, the tower placement surface 161). The tower placement surface 161 and the protection portion 162 are both provided in the second area F2, but other configurations (not illustrated) of the medal tower forming device 16 may be provided on one or both of the first area F1 and the second area F2.

The tower placement surface 161 is configured to determine a forming position of the medal tower, that is, a predetermined position P2. The tower placement surface 161 is provided at the same height position as the placement surface 12 in the first area F1. The protection portion 162 is provided around the tower placement surface 161. Further, as illustrated in FIG. 3, the protection portion 162 includes a wall portion 163 and a door 164 that can be opened and closed with respect to the wall portion 163. The door 164 is provided to always close an opening of the wall portion 163 by a spring (not illustrated) when not receiving any other external force. On the other hand, when the door 164 receives a force in a direction D21 from an extruder 171 of the transporter 17, which will be described below, it is possible to open or close the opening of the wall portion 163 in conjunction with an operation of the extruder 171.

Further, the medal tower forming device 16 is coupled to the second medal supply path 302 (see FIG. 1). Specifically, the medal tower forming device 16 is connected to a second medal hopper (not illustrated), which will be described below, of the second medal supply path 302 via the medal transport passage so that the medal tower forming device 16 is coupled to the second medal supply path 302. Thus, the second medal hopper of the second medal supply path 302 can supply medals for forming the medal tower to the medal tower forming device 16 on the basis of the control of the controller 50.

Transporter 17

The transporter 17 is configured to connect the medal tower forming game to the medal acquisition game by moving the medal tower at the predetermined position P2 of the second area F2 to a placement position P1 (see FIG. 2) of the placement surface 12 of the first area F1.

As illustrated in FIGS. 3 and 6A to 6C, the transporter 17 includes the extruder 171 that pushes the medal tower from the predetermined position P2 to the placement position P1 by coming into contact with the medal tower. The extruder 171 horizontally moves reciprocally with respect to the placement surface 12 in a second direction D2 illustrated in FIG. 3. The second direction D2 is a direction intersecting (substantially orthogonal to) the first direction D1, that is, the longitudinal direction of the placement surface 12.

Further, a tip of the extruder 171 is provided to come into contact with the door 164 of the protection portion 162. When the extruder 171 moves from the predetermined position P2 to the placement position P1, that is, from the second area F2 to the first area F1 in one direction D21 of the second direction D2, the door 164 is pushed and opened from the extruder 171 by the force in the direction D21. On the other hand, when the extruder 171 starts to move from the placement position P1 to the predetermined position P2, that is, from the first area F1 to the second area F2 in the other direction D22 of the second direction D2, force in the direction D21 acting on the door 164 from the extruder 171 disappears, and the door 164 is closed by spring force. Further, in a standby state in which the extruder 171 does not transport the medal tower, the extruder 171 is located on the second area F2 side as illustrated in FIG. 6A. In this case, the door 164 is closed.

Ball Processing Unit 18

The ball processing unit 18 is configured to perform circulation of the lottery balls and supply of the balls for the medal game. As illustrated in FIG. 3, the ball processing unit 18 includes a lottery operation button 180, a lottery ball circulation portion 181, and a ball discharge portion 182 that constitutes an outlet end of the first ball supply path 401.

The lottery operation button 180 is provided in an external area and is a button for starting a roulette lottery in a ball lottery game. Specifically, when the player presses the lottery operation button 180, the controller 50 transmits a roulette lottery start instruction to the lottery ball circulation portion 181 and the display unit 19 accordingly and starts the roulette lottery. The lottery operation button 180 may be used as a button for ending the roulette lottery.

As illustrated in FIG. 3, the lottery ball circulation portion 181 includes a lottery ball inlet 183 for dropping the lottery balls, a lottery ball reception portion 185 provided around the lottery ball inlet 183, a roulette lottery sensor (not illustrated) provided at the lottery ball inlet 183, and a circulation portion that circulates the lottery balls inside and outside the lottery ball circulation portion 181 via the lottery ball inlet 183. Here, the lottery balls are dedicated balls used only for the lottery ball circulation portion 181 and are different from the balls supplied to the ball supply portion 40. Further, the lottery balls do not feed the first ball supply path 401 and the second ball supply path.

When the player does not operate the lottery operation button 180, the lottery balls stand by at a lottery standby position (not illustrated) below the lottery ball inlet 183 by the circulation portion. On the other hand, when the ball lottery game starts, the roulette starts to rotate on a screen of the display unit 19. Thereafter, when the player operates the lottery operation button 180, the lottery balls are lifted above the lottery ball inlet 183 from the lottery standby position by a ball transporter (not illustrated) and fed into the lottery ball reception portion 185. The lottery balls drop to the lottery ball inlet 183 after performing a circular motion for about 15 seconds at the lottery ball reception portion 185. Further, at a moment when the lottery ball drops to the lottery ball inlet 183, rotation of the roulette is stopped and a result of the lottery is settled. Thereafter, the lottery balls return to the lottery standby position via an internal transport path of the circulation portion by the ball transporter and stand by.

As illustrated in FIG. 3, the ball discharge portion 182 includes a ball discharge port 184, a discharge guide portion 186, and a ball transport path and a ball storage portion inside the ball discharge portion 182 (not illustrated). Here, the balls supplied by the ball discharge portion 182 are balls that are used in the medal game, not the lottery balls used in the lottery ball circulation portion 181.

The ball storage portion is connected to the first ball supply path 401 and the ball discharge port 184 by a ball transport path. At the time of the game, the ball storage portion can store a certain number of balls supplied from the first ball supply path 401 under the control of the controller 50, and when the ball is won by a lottery on the screen of the display unit 19, the ball storage portion can discharge the stored balls from the ball discharge port 184 to the outside of the ball discharge portion 182. The discharged balls are moved to the upper surface of the pusher table 13 or the placement surface 12 in the first area F1 according to the guidance of the discharge guide portion 186 provided below the ball discharge port 184.

Display Unit 19

The display unit 19 is configured to perform a display of various types of game content or game information regarding the medal game. The game content according to the present embodiment includes, for example, a display of a roulette in a ball lottery game, and the game information according to the present embodiment includes, for example, the number of medals put into the medal reception port 111 by the player, a change in the number of medals, and information per prize.

Operation of First Medal Game Machine 10

Subsequently, a movable configuration of the first medal game machine 10, that is, operations of the medal feeder 11, the pusher table 13, the medal tower forming device 16, and the transporter 17, will be described. These configurations of the first medal game machine 10 operate under the control of the controller 50. In the following description, the non-direct feeding scheme in the operation of the medal feeder 11 will be mainly described.

Operation of Medal Feeder 11

When the player feeds a medal into the medal reception port 111, the medal feeder 11 stores the medals in the second main medal hopper 320 (FIG. 4) of the fourth medal supply path 304. Thereafter, when the player presses the feeding button 113 once, the first medal hopper 311 immediately ejects one medal into the first medal supply path 301. The medal ejected by the first medal hopper 311 drops downward due to its own weight along the drop guide rail 114, hits the feeding adjustment portion 116 immediately after exiting the medal feeding port 115, and jumps toward the placement surface 12 of the first area F1 and the upper surface of the pusher table 13 in a state in which the flying state (a direction, a height, a speed, or the like) has been adjusted. Therefore, the feeding of one medal is completed. Thus, the medal feeder 11 plays the medal feeding game by repeating the above operation.

Operation of Pusher Table 13

The pusher table 13 reciprocates in the first direction D1 at a constant speed to move the medals, the medal towers, and the balls placed on the placement surface 12, and drop the medals, the medal towers, and the balls from the placement surface 12 to the drop hole 14. Thus, the pusher table 13 plays the first medal pushing game and the ball pushing game by repeating the above operation.

Further, a reciprocating movement of the pusher table 13 and the operation of feeding medals in the medal feeder 11 are performed without affecting each other. Therefore, the first medal pushing game and the ball pushing game by the pusher table 13 and the medal feeding game by the medal feeder 11 can be played at the same time.

Operation of Medal Tower Forming Device 16 and Transporter 17

The medal tower forming device 16 starts to operate on the basis of a lottery result of the ball lottery game, that is, the number of layers of the drawn medal tower. Specifically, when the second medal hopper of the second medal supply path 302 receives the lottery result from the controller 50, the second medal hopper supplies the number of medals required for forming of the medal tower having the number of layers in the lottery result to the medal tower forming device 16. The medal tower forming device 16 forms the medal tower at the predetermined position P2 by arranging the medals supplied by the second medal hopper on the basis of a predetermined arrangement method.

After the medal tower is formed, the controller 50 transmits a transport request for the medal tower to the transporter 17. The extruder 171 of the transporter 17 comes into contact with the medal tower at the predetermined position P2 and pushes the medal tower toward the placement position P1 in the one direction D21 of the second direction D2, thereby realizing the transport of the medal tower. Further, before the medal tower is pushed out from the second area F2, the door 164 of the protection portion 162 is opened due to the movement in the direction D21 of the extruder 171. Therefore, the medal tower can be moved later from the second area F2 to the first area F1 without colliding with the door 164. After the extruder 171 transports the medal tower to the placement position P1, the extruder 171 exits from the first area F1 toward the second area F2 in the other direction D22 of the second direction D2.

Hereinafter, a process from a time when the extruder 171 comes into contact with the medal tower at the predetermined position P2 and starts to move the medal tower toward the placement position P1 to a time when the extruder 171 finishes moving the medal tower to the placement position P1 is called a "transport process" of the extruder 171, and a process from a time immediately after the transport process is performed to a time when the extruder 171 exits from the first area F1 is called an "exit process" of the extruder 171.

Thus, the medal tower forming device 16 and the transporter 17 are playing the medal tower forming game according to the above operation. Further, the medal tower forming device 16 can form the medal tower at the same time as the feeding of the medals in the medal feeder 11 and the movement of the pusher table 13. Therefore, it is possible to shorten a waiting time for medal tower forming, to realize elimination of stress of the player due to the inability to play the medal pusher acquisition game during the waiting time, and to play the medal game at a good tempo.

On the other hand, in the transport process and the exit process of the extruder 171, the feeding of the medals in the medal feeder 11 and the movement of the pusher table 13 in the first direction D1 are stopped by the control of the controller 50. Therefore, it is possible to curb collapse of the medal tower during transport and the damage of the extruder during the exit due to the feeding of the medals.

Further, in the transport process and the exit process of the extruder 171, the medal feeder 11 can receive medals from the outside and the number of medals received by the medal feeder 11 is calculated in the transport process under the control of the controller 50. On the other hand, in the transport process and the exit process of the extruder 171, even when the player operates the feeding button 113, the first medal hopper 311 does not feed the medals into the first area F1. On the other hand, the player can, for example, medal replenishment through the medal reception port 111 by using a time related to the transport process and the exit process of the extruder 171.

Second Medal Game Machine 20

Figure 7:
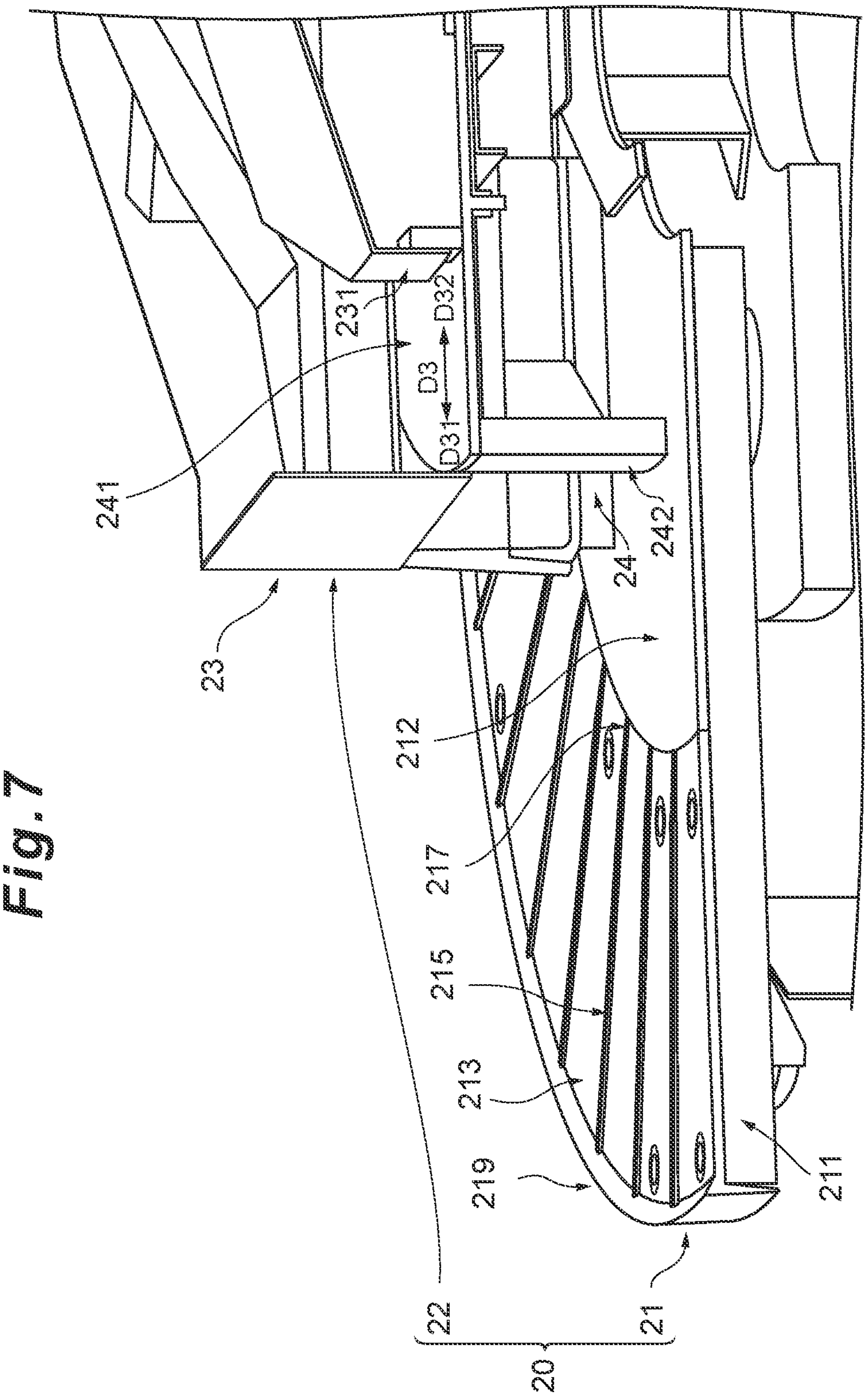
FIG. 7 is a diagram illustrating a configuration of a second medal game machine according to the present embodiment.

Subsequently, a configuration of the second medal game machine 20 will be described with reference to FIGS. 1, 5, and 7. FIG. 7 is a diagram illustrating a configuration of a second placement surface 213 of the rotation base portion 21.

The second medal game machine 20 is configured to be used for the second medal pushing game and is provided in the game area Fc. As illustrated in FIGS. 1, 5 and 7, the second medal game machine 20 includes the rotation base portion 21 that can rotate, and the center pusher table 22 provided above the rotation base portion 21 and coaxially with the rotation base portion 21.

Rotation Base Portion 21

The rotation base portion 21 is an annular member and can rotate in the game area Fc. As illustrated in FIG. 7, the rotation base portion 21 includes a base plate 211, a first placement surface 212 provided at a center of an upper surface of the base plate 211, and the second placement surface 213 provided on the upper surface of the base plate 211 and around the first placement surface 212.

The first placement surface 212 is configured to place medals supplied by the second medal hopper. A plan view shape of the first placement surface 212 is an annular shape. Further, because the center pusher table 22 moves on the first placement surface 212, an upper surface of the first placement surface 212 is formed flat.

The second placement surface 213 has a configuration for placing medals and balls. Further, a plan view shape of the second placement surface 213 is an annular shape. A plurality of ribs 215 and a guide slope 219 are provided on an upper surface of the second placement surface 213. The guide slope 219 is provided in a peripheral edge of the upper surface of the second placement surface 213, so that the balls and medals in the peripheral edge of the second placement surface 213 can be easily dropped onto the second placement surface 213.

The plurality of ribs 215 are provided in a radial pattern. Thus, when one player uses the second medal game machine 20, the medals and balls pushed by the center pusher table 22 can move along the rib 215. As a result, moving directions of the medals and the balls are restricted, and feed of the medals and the balls to the game area Fs of other players can be curbed.

Further, the rib 215 includes an end portion 217 connected to the first placement surface 212. A height of the rib 215 (except for the end portion 217) is uniform in a radial direction of the rib 215, and the height is formed to be slightly smaller than a thickness of the medal, for example. On the other hand, a height of the end portion 217 gradually decreases toward the first placement surface 212. Thus, when the medals placed on the first placement surface 212 are pushed, these medals can be easily moved to the second placement surface 213.

Center Pusher Table 22

The center pusher table 22 has a configuration used for the second medal pushing game and is provided above the first placement surface 212. As illustrated in FIG. 7, the center pusher table 22 includes a base portion 23 and a pusher table main body 24. When the center pusher table 22 does not rotate, the base portion 23 does not move with respect to the rotation base portion 21, while the pusher table main body 24 can move horizontally back and forth in a third direction D3 illustrated in FIG. 7 with respect to the rotation base portion 21 under the control of the controller 50. Further, a moving width of the pusher table main body 24 can be changed.

Thus, each configuration of the second medal game machine 20 operates under the control of the controller 50. Each time the main medal hopper 300 supplies the medals to an upper surface 241 of the pusher table main body 24 of the center pusher table 22 via the third medal supply path 303, the pusher table main body 24 reciprocates once in the third direction D3, drops the supplied medal onto the first placement surface 212, and then moves the medal to the second placement surface 213.

Specifically, when a medal is supplied to the upper surface 241 of the pusher table main body 24, the pusher table main body 24 first moves in one direction D32 of the third direction D3. The medal mounted on the upper surface 241 moves in the direction D32 as the pusher table main body 24 moves in the direction D32, and the movement in the direction D32 stops by the medal coming into contact with a plate portion 231 of the base portion 23. On the other hand, in this case, because the pusher table main body 24 continues to move in the direction D32, the medal originally supported by the upper surface 241 is not supported by the upper surface 241 and is dropped on the first placement surface 212. Thereafter, the pusher table main body 24 moves in the other direction D31 of the third direction D3. The pusher surface 242 of the pusher table main body 24 pushes the medal dropped on the first placement surface 212 onto the second placement surface 213. Further, the extruded medals continue to move in the direction D31, push the medals and balls near the guide slope 219 onto the peripheral edge side of the second placement surface 213, and drop the medals and the balls from the second placement surface 213 onto a ball guide portion 41 of the ball supply portion 40, which will be described below.

Thus, the pusher table main body 24 is playing the second medal pushing game once according to the above operation. Further, the above operation of the pusher table main body 24 can be performed at the same time as the medal acquisition game and the medal tower forming game.

Medal Supply Portion 30

Next, a configuration of the medal supply portion 30, that is, a configuration of the first medal supply portion 31 and the second medal supply portion 32 will be described with reference to FIGS. 1, 3, and 4.

First Medal Supply Portion 31

The first medal supply portion 31 is connected to each of the first medal game machine 10 and the second medal game machine 20 to be able to provide medals to the first medal game machine 10 and the second medal game machine 20. Specifically, as illustrated in FIG. 4, the first medal supply portion 31 includes the main medal hopper 300 provided on the lower side of the medal game machine 1, the two first medal hoppers 311 and the third reception port 313 provided on the upper side of the medal game machine 1, the second medal hopper (not illustrated) provided inside the medal game machine 1 (specifically, the medal tower forming device 16), and a third discharge port 323 communicated with the third reception port 313, which is provided on the upper side of the center pusher table 22. Here, the two first medal hoppers 311 and the second medal hoppers are three sub-medal hoppers of the main medal hopper 300. Further, the first medal supply portion 31 includes a medal transport passage that connects these configurations to each other.

The main medal hopper 300 is configured to store medals necessary for playing a medal game in advance, supply the stored medals to each of the three sub-medal hoppers for supplying the medals to the first medal game machine 10, and the center pusher table 22 of the second medal game machine 20 at the time of the game, and collect medals dropped into the drop hole 14 from the placement surface 12.

When the main medal hopper 300 collects the medals dropped into the drop hole 14, the count hopper 310 provided in an upper portion of the main medal hopper 300 calculates the number of the medals dropped into the drop hole 14, increases the number of credits, and displays the number on the display unit 19. When there are one or more credits, the player can operate the payout button 117 to pay out the medals. Further, the medals paid out to the player are not the medals stored in the main medal hopper 300, but medals stored in the second main medal hopper 320 of the second medal supply portion 32, which will be described below.

The three sub-medal hoppers are smaller in size and cheaper than the main medal hopper 300. By adopting such a combination of the main medal hopper 300 and the sub-medal hopper, it is possible to curb an increase in a dimension (particularly, a dimension in a width direction) of the medal game machine 1 and to reduce a manufacturing cost of the medal supply portion 30.

Further, the three sub-medal hoppers can store the medals supplied by the main medal hopper 300, and supply the stored medals to the first medal game machine 10. More specifically, the main medal hopper 300 and the two first medal hoppers 311 constitute the two first medal supply paths 301 that supply medals to the placement surface 12 of the first medal game machine 10 and the upper surface of the pusher table 13. The main medal hopper 300 and the second medal hopper constitute the second medal supply path 302 for supplying the medals to the medal tower forming device 16 of the first medal game machine 10. The main medal hopper 300, the third reception port 313, and the third discharge port 323 form a third medal supply path 303 for supplying medals to the center pusher table 22 of the second medal game machine 20.

Further, each of the main medal hopper 300, the two first medal hoppers 311, and the second medal hopper is provided with a main medal sensor, two first medal sensors, and a second medal sensor (not illustrated). Each medal sensor monitors the number of medals stored in each medal hopper. Specifically, when the first medal sensor and the second medal sensor detect that the number of medals stored in the corresponding sub-medal hoppers has decreased to a predetermined number or less, the first medal sensor and the second medal sensor transmit a medal replenishment request to the controller 50. The controller 50 causes the main medal hopper 300 to supply the medals to each of the two first medal hoppers 311 and the second medal hopper in response to the medal replenishment request from the medal sensor. On the other hand, when there is a medal replenishment request from the second medal game machine 20, the controller 50 directly supplies medals to the center pusher table 22 of the second medal game machine 20 via the third medal supply path 303 in response to the medal replenishment request.

Here, when the controller 50 receives the medal replenishment request from the medal sensor and the medal replenishment request from the second medal game machine 20 at the same time, the controller 50 preferentially supplies the medals to the center pusher table 22. Further, when the controller 50 receives the medal replenishment request from the second medal game machine 20 after receiving the medal replenishment request from the medal sensor, the controller 50 stops supplying the medals to the two first medal hoppers 311 and the second medal hopper, and preferentially supplies the medals to the center pusher table 22. Thus, it is possible to rapidly perform medal supply to the center pusher table 22 shared and used by four players by preferentially supplying the medals to the center pusher table 22, and to avoid a situation in which none of the four players can use the second medal game machine 20 due to stagnation of the process for supplying the medals to the center pusher table 22.

Second Medal Supply Portion 32

As illustrated in FIG. 1, the second medal supply portion 32 is connected to each of the medal reception port 111 and the payout port 15. Specifically, as illustrated in FIGS. 1 and 4, the second medal supply portion 32 includes the second main medal hopper 320 provided on the lower side of the medal game machine 1. The second main medal hopper 320 is connected to the medal reception port 111 and the payout port 15 for paying out via the medal transport passage to form the fourth medal supply path 304.

Further, the second main medal hopper 320 is a medal hopper independent of the main medal hopper 300. The second main medal hopper 320 is configured to store the medals fed by the player in advance and pay out a predetermined number of medals among the stored medals to the payout port 15 when the credit displayed on the display unit 19 is one or more and the player operates the payout button 117.

The second main medal hopper 320 is provided with a second main medal sensor (not illustrated). The second main medal sensor detects the feeding of the medals by the player and the number of medals as information on the number of fed medals and transmits the information to the controller 50. Subsequently, the controller 50 determines whether or not there is a transport request for the medal tower and whether or not the exit process of the extruder 171 ends, and then performs control in the feeding of the medal into the first area F1.

Specifically, when the controller 50 determines that there is no transport request for the medal tower and the exit process of the extruder 171 ends, the controller 50 transmits the information on the number of fed medals from the second main medal sensor to the first medal sensor of the first medal hopper 311 on one first medal feeding path 301 selected by the player immediately after the information on the number of fed medals is received on the basis of a setting of a medal feeding method, or when the information on the number of fed medals is received and the player operates the feeding button 113. After the first medal sensor of the first medal hopper 311 counts the number of medals equivalent to information on the number of fed medals, the first medal hopper 311 feeds the counted medals into the first area F1 via the first medal supply path 301 selected by the player. On the other hand, when the controller 50 determines that there is the transport request for the medal tower or the exit process of the extruder 171 does not ends, the controller 50 performs transmission to the main medal sensor described above after responding to the transport request or after the exit process has ended.

Further, the second main medal sensor counts the number of medals to be paid out to the payout port 15 when the credit displayed on the display unit 19 is one or more and the player operates the payout button 117. After the second main medal sensor counts the medals to be paid out, the second main medal hopper 320 pays out the counted medals to the payout port 15. For the sensor for counting the medals to be paid out to the payout port 15, the second main medal sensor may not be used, but a dedicated sensor for counting the medals to be paid out may be adopted.

Ball Supply Portion 40

Next, a configuration of the ball supply portion 40 will be described with reference to FIG. 5.

The ball supply portion 40 is provided to be able to provide balls to the first medal game machine 10 and the second medal game machine 20. Specifically, as illustrated in FIG. 5, the ball supply portion 40 includes the ball guide portion 41 provided in the first area F1, the ball lift 42 provided in the third area, and a ball transport passage 43, and a ball distribution portion 44. The ball distribution portion 44 connects the ball lift 42 to the ball transport passage 43.

The ball guide portion 41 includes a guide passage 410 that guides the balls dropped from the second placement surface 213, a first ball sensor 411 that detects first ball information related to the number of balls on the placement surface 12 and the upper surface of the pusher table 13, and a second ball sensor 412 that detects second ball information related to the number of balls dropped from the second placement surface 213.

The first ball sensor 411 and the second ball sensor 412 transmit the detected first ball information and second ball information to the controller 50. The controller 50 can control a ball drive portion in the ball storage portion performed by the ball processing unit 18 and/or a ball drive portion in the second transport passage 432 on the basis of the first ball information and the second ball information. The controller 50 can replenish balls on the placement surface 12 or the upper surface of the pusher table 13 and/or the second placement surface 213.

The ball lift 42 has a worm and is provided so that the axial direction is perpendicular. The ball can be mounted on teeth of the worm of the ball lift 42. Further, the ball lift 42 includes a drive portion (not illustrated). The drive portion can transport the balls mounted on the teeth of the worm to the ball distribution portion 44 on the upper end side of the ball lift 42 by rotating the ball lift 42 around an axis of the worm.

The ball distribution portion 44 is connected to each of the first transport passage 431 and the second transport passage 432. Further, the ball distribution portion 44 can distribute the balls transported by the ball lift 42 to either the first transport passage 431 or the second transport passage 432 on the basis of the control of the controller 50.

The ball transport passage 43 includes a first transport passage 431 for providing balls to the placement surface 12 of the first medal game machine 10 and the upper surface of the pusher table 13, and a second transport passage 432 for supplying balls to the second placement surface 213 of the second medal game machine 20.

The first transport passage 431 can store the balls distributed by the ball distribution portion 44. The first transport passage 431 can supply the stored balls to the ball storage portion of the ball discharge portion 182. The second transport passage 432 can supply the balls distributed by the ball distribution portion 44 to the second placement surface 213 as they are.

Further, the first transport passage 431 includes a first ball drive portion (not illustrated) that drives the discharge of the balls stored in the first transport passage 431 to the ball storage portion of the ball discharge portion 182, and a first ball transport path sensor that detects the number of balls stored in the ball storage portion of the ball discharge portion 182. The first ball transport path sensor transmits the first ball replenishment information to the controller 50 when the number of balls in the ball storage portion of the detected ball discharge portion 182 is equal to or smaller than a predetermined number. When the controller 50 receives the first ball replenishment information, the controller 50 controls the ball distribution portion 44 on the basis of the first ball replenishment information to supply the balls to the first transport passage 431. On the other hand, when the controller 50 does not receive the first ball replenishment information, the controller 50 controls the ball distribution portion 44 to supply the balls to the second transport passage 432.

The first ball drive portion is activated by the control of the controller 50. Specifically, when the controller 50 receives the first ball information from the first ball sensor 411, the controller 50 activates the first ball drive portion and discharge the balls stored in the first transport passage 431 to the ball storage portion of the ball discharge portion 182. Further, when the balls stored by the ball storage portion of the ball discharge portion 182 are discharged from the ball discharge port 184, the balls can be supplied to the placement surface 12 or the upper surface of the pusher table 13 by the discharge guide portion 186.

Here, the balls dropped from the second placement surface 213 by the second transport passage 432 passes through the upper surface of the pusher table 13 and reaches the placement surface 12. The balls dropped from the second placement surface 213 are dropped into the drop hole 14 by the pusher of the pusher table 13 together with the balls originally existing on the placement surface 12. The ball dropped into the drop hole 14 is moved to the ball lift 42 by the ball guide portion and is mounted on the teeth of the worm of the ball lift 42. Thereafter, the balls are transported to the first transport passage 431 or the second transport passage 432 by the ball lift 42 and the ball distribution portion 44, and are supplied to the ball storage portion or the second placement surface 213 of the ball discharge portion 182. Among these configurations, a common configuration for ball transport before the balls are distributed by the ball distribution portion 44 (hereinafter referred to as a "common ball transport configuration"), the first transport passage 431, and the ball discharge portion 182 constitute the first ball supply path 401. On the other hand, the common ball transport configuration and the second transport passage 432 form the second ball supply path 402.

Control by Controller 50

Figure 8:
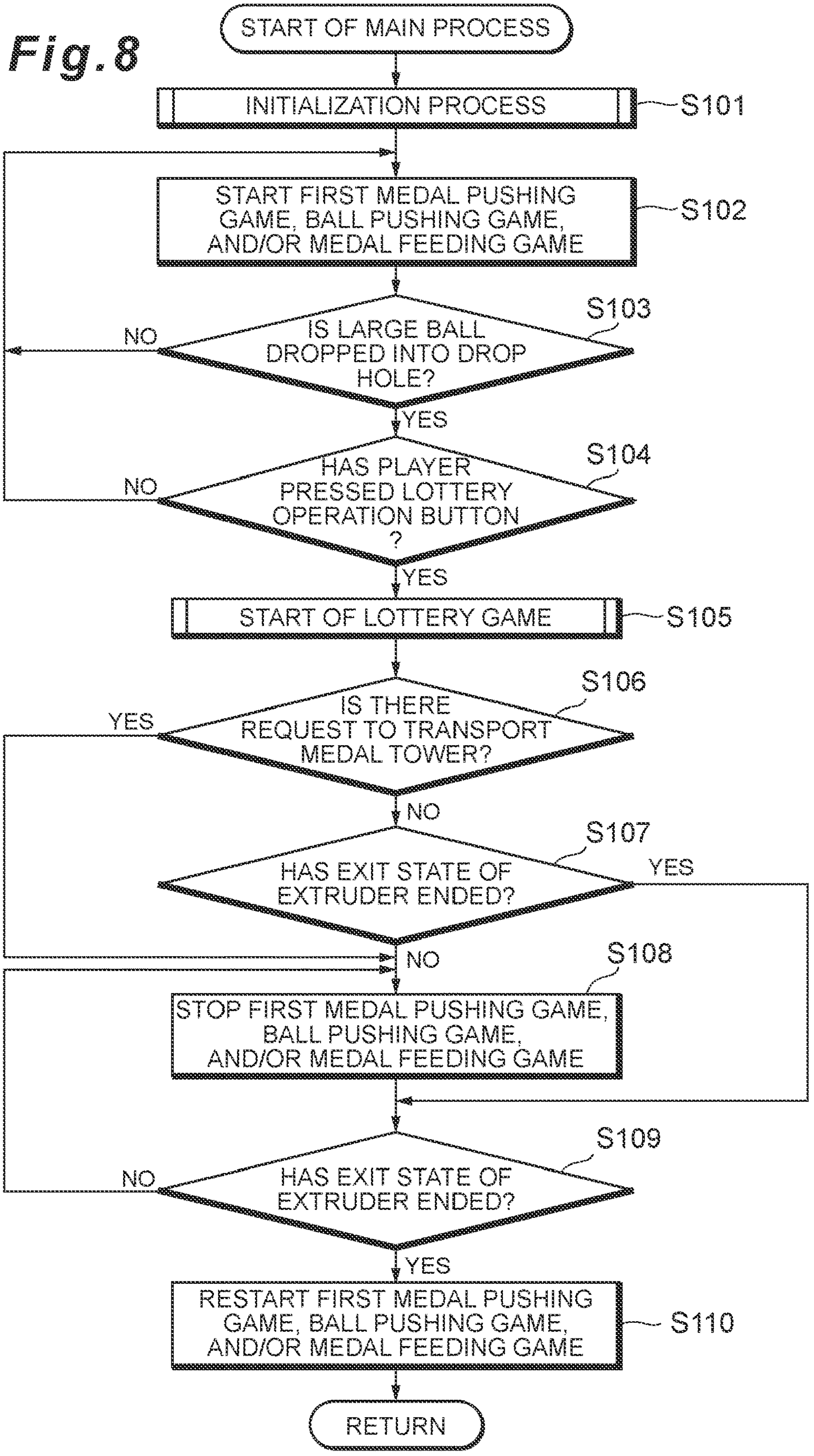
FIG. 8 is a flowchart illustrating control of a medal game by a controller of the medal game machine according to the present embodiment.
Figure 9:
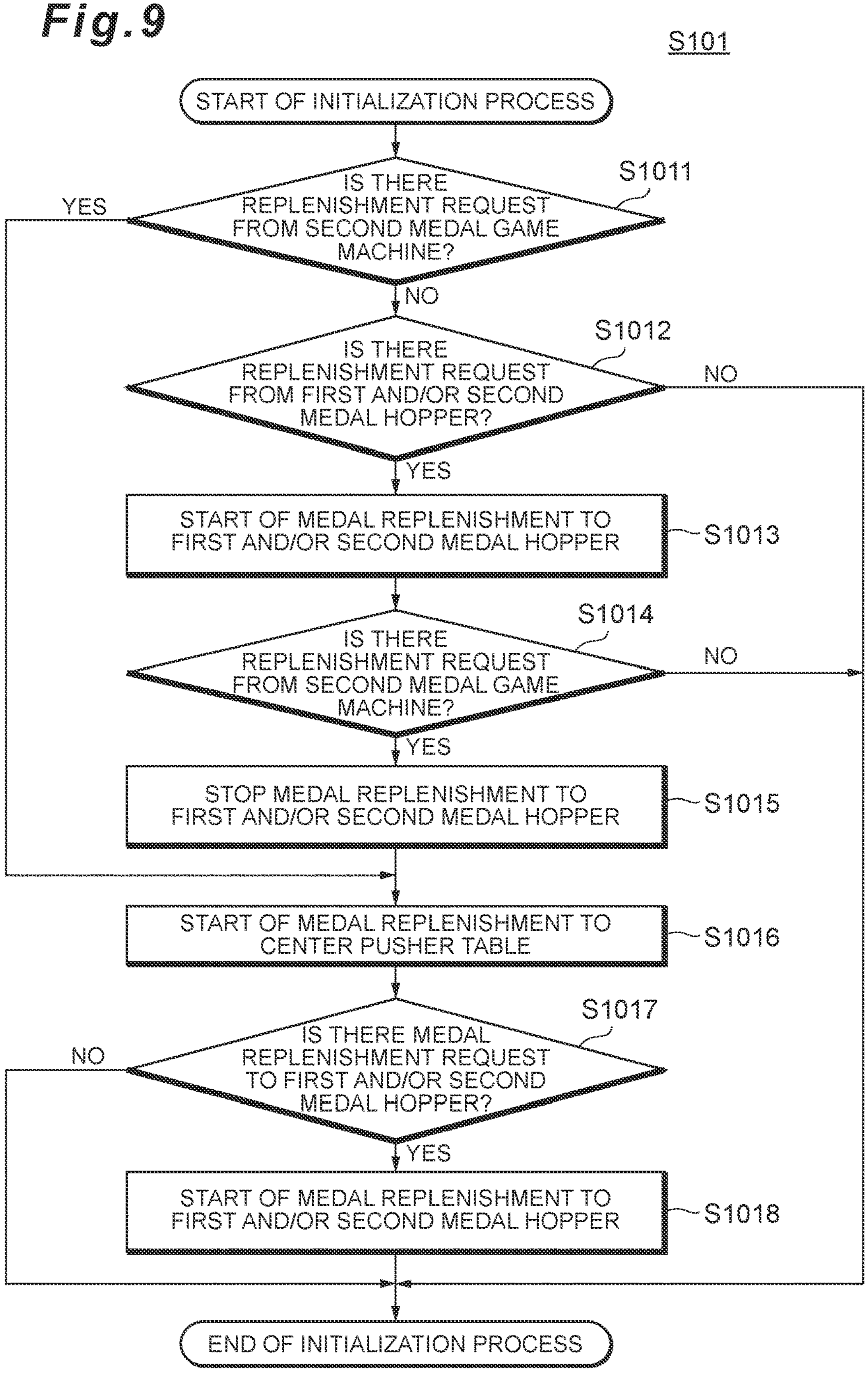
FIG. 9 is a flowchart illustrating details of step S101 of FIG. 8.
Figure 10:
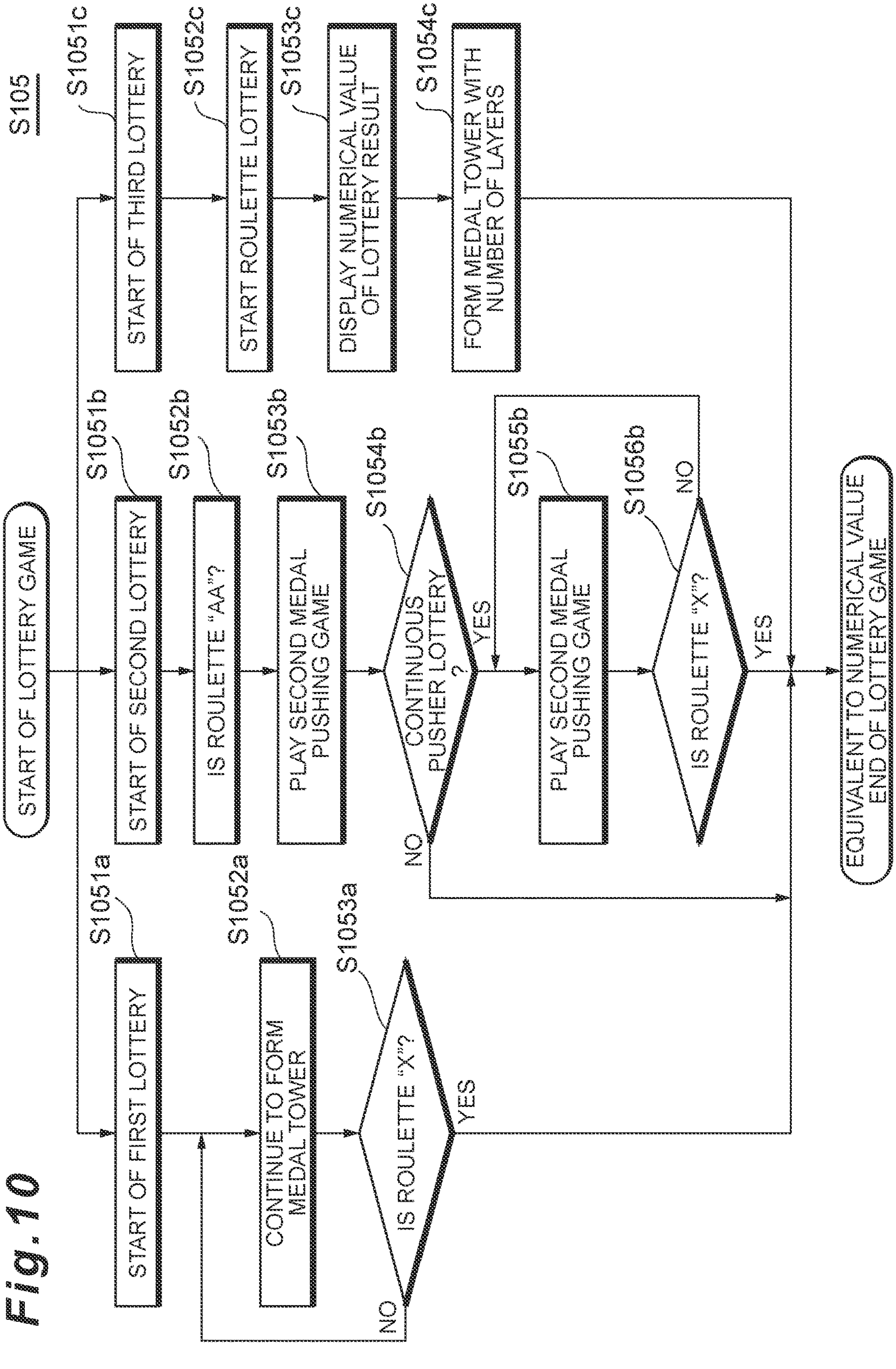
FIG. 10 is a flowchart illustrating details of step S105 of FIG. 8.

Subsequently, an example of the control by the controller 50, that is, process related to the medal game performed on the basis of data and the program stored in a memory by the controller 50 will be described in detail with reference to FIGS. 8 to 10. Depending on the setting, the controller 50 can perform process related to different medal games. FIG. 8 is a flowchart illustrating control of the medal game by the controller 50. FIG. 9 is a diagram illustrating details of step S101, and FIG. 10 is a diagram illustrating details of step S105.

Step S101

First, the controller 50 performs initialization process.

In step S101, the controller 50 controls the medal supply portion 30 to ensure that each sub-medal hopper has sufficient medals to play the medal game. Specifically, as illustrated in FIG. 9, the controller 50 first determines whether or not there is a medal replenishment request from the second medal game machine 20 (step S1011). When there is no medal replenishment request from the second medal game machine 20 (NO in step S1011), the controller 50 determines whether or not there is a medal replenishment request from the first and/or second medal hopper (step S1012). When there is the medal replenishment request from the first and/or second medal hopper (YES in step S1012), the controller 50 starts to replenish medals to the first and/or second medal hopper (step S1013). Then, the controller 50 determines whether or not there is a medal replenishment request from the second medal game machine 20 (step S1014). When there is a medal replenishment request from the second medal game machine 20 (YES in step S1014), the controller 50 stops supplying the medals to the first and/or second medal hopper (step S1012), and preferentially performs supply of medals to the center pusher table 22 (step S1016). Subsequently, the controller 50 determines whether or not there is a medal replenishment request from the first and/or second medal hopper (step S1017). When there is a medal replenishment request from the first and/or second medal hopper (YES in step S1017), the controller 50 starts (restarts) medal replenishment to the first and/or second medal hopper (step S1018). Thus, the controller 50 ends the initialization process.

On the other hand, when there is a medal replenishment request from the second medal game machine 20 in step S1011, the controller 50 preferentially supplies medals to the center pusher table 22 (S1016). Subsequent steps are the same as steps S1017 and S1018 described above. Further, in step S1014, when there is no medal replenishment request from the second medal game machine 20, the controller 50 ends the initialization process. Further, in step S1017, even when there is no medal replenishment request from the first and/or second medal hopper, the controller 50 also ends the initialization process.

Step S102

Then, the controller 50 starts the first medal pushing game, the ball pushing game, and/or the medal feeding game.

Specifically, the controller 50 plays the first medal pushing game, the ball pushing game, and/or the medal feeding game by controlling the medal feeder 11, the pusher table 13, and the medal supply portion 30. Details of the operation of the above configuration are the same as those described in the operation description of the first medal game machine 10 described above, and the details are omitted here.

Steps S103 to S105

Subsequently, the controller 50 determines whether or not the ball dropped into the drop hole 14 by the ball pushing game is a large ball on the basis of the ball information transmitted by the ball identification sensor of the ball guide portion (step S103). When the large ball drops into the drop hole 14 (YES in step S103), the controller 50 determines whether or not the player has pressed the lottery operation button 180 (step S104). When the player presses the lottery operation button 180 (YES in step S104), the controller 50 starts the lottery game (step S105).

On the other hand, when the small ball drops into the drop hole 14 (NO in step S103) and when the player does not press the lottery operation button 180 (NO in step S104), the controller 50 returns to the process of step S102.

For details of the lottery game, as illustrated in FIG. 10, the controller 50 plays a lottery game corresponding to the color of the dropped large ball on the basis of the ball information transmitted by the ball identification sensor of the ball guide portion. For example, when the color of the dropped large ball is a first color, the controller 50 starts the first lottery game (step S1051*a*). Subsequently, the roulette rotates a plurality of times, the number of layers of the medal tower to be formed is drawn a plurality of times, and the medal tower forming device 16 continues to form a medal tower with a corresponding number of layers equivalent to each numerical value of each lottery result on the basis of the numerical value of each lottery result (step S1052*a*). Thereafter, the controller 50 determines whether or not the lottery roulette is "X" (step S1053*a*). When the lottery roulette is "X" (YES in step S1053*a*), the controller 50 ends the lottery game.

On the other hand, when the lottery roulette is not "X" (NO in step S1053*a*), the controller 50 returns to the process of step S1052*a*.

Further, when the color of the dropped large ball is a second color, the controller 50 starts the second lottery game (step S1051*b*). The roulette becomes "AA" (step S1052*b*), and the controller 50 plays the second medal pushing game (step S1053*b*). Here, each time the second medal pushing game is played, the center pusher table 22 performs one pusher. That is, the center pusher table 22 reciprocates once in the third direction D3. Subsequently, the controller 50 confirms whether or not the player performs a continuous pusher lottery via the display unit 19 (step S1054*b*). When the player pays an additional game fee and the roulette is "O" (YES in step S1054*b*), the controller 50 plays the second medal pushing game at the second time (step S1055*b*). Thereafter, the controller 50 determines whether or not the lottery roulette is "X" (step S1056*b*). When the lottery roulette is "X" (YES in step S1056*b*), the controller 50 ends the lottery game.

On the other hand, when the player does not pay the additional game fee and the roulette is not "O" (NO in step S1054*b*), and when the lottery roulette is not "X" (NO in step S1056*b*), the controller 50 returns the process to step S1055*b*.

Further, when the color of the dropped large ball is a third color, the controller 50 starts a third lottery game (step S1051*c*). The roulette lottery starts (step S1052*c*), and a numerical value of a lottery result is displayed (step 1053*c*). Therefore, the controller 50 forms a medal tower with a number of layers equivalent to the numerical value of the lottery result on the basis of the numerical value of the lottery result (S1054*c*). After the medal tower is completed, the controller 50 ends the lottery game.

Steps S106 to S108

Next, returning to FIG. 8, the controller 50 determines whether or not there is a transport request to transport the medal tower (step S106). When there is no transport request (NO in step S106), the controller 50 determines whether or not an exit state of the extruder 171 has ended (step S107). When the exit state of the extruder 171 has not ended (NO in step S107), the controller 50 stops the ongoing game among the first medal pushing game, the ball pushing game, and the medal feeding game (step S108). Thereafter, the controller 50 determines again whether or not the exit state of the extruder 171 has ended (step S109). When the exit state of the extruder 171 has ended (YES in step S109), the controller 50 restarts the stopped first medal pushing game, ball pushing game, and/or medal feeding game (step S110).

On the other hand, when there is the transport request (YES in step S106), the controller 50 proceeds to process of step S108, and when the exit state of the extruder 171 does not ended (NO in step S109), the controller 50 returns to the process of step S108. Further, when the exit state of the extruder 171 has ended (YES in step S107), the controller 50 proceeds to process of step S109.

On the other hand, when the extruder 171 is in a transported state (YES in step S107), the controller 50 proceeds to process of step S109. Further, when the extruder 171 is not in an exit state (NO in step S108), the controller 50 proceeds to process of step S110.

Steps S110 and S111

Thereafter, the controller 50 determines whether or not the extruder 171 is in a standby state (step S110). When the extruder 171 is in the standby state (YES in step S107), the controller 50 restarts the first medal pushing game and/or the medal feeding game (step S111). The controller 50 ends the lottery game.

On the other hand, when the extruder 171 is not in the standby state (NO in step S107), the controller 50 returns to the process of step S109.

Thereafter, the controller 50 returns to the process of step S102. Thus, the controller 50 performs control of the medal game by repeating the above steps.

The medal game machine 1 according to the above-described embodiment includes the medal feeder 11 configured to receive medals from the outside and feed the medals into the first area F1; the placement surface 12 on which the medals are placed; the pusher table 13 configured to move the medals placed on the placement surface 12; the medal tower forming device 16 configured to form one or more layers of medal tower at the predetermined position P2; and the transporter 17 configured to transport the medal tower formed at the predetermined position P2 to the placement surface 12, wherein, when the placement surface 12 is viewed in a plan view, the placement surface 12 and the pusher table 13 are in the first area F1, and the predetermined position P2 is in the second area F2 outside the first area F1, and the medal tower forming device 16 can forms a medal tower that is visible from the outside of the medal game machine 1. As a result, the medal acquisition game and the medal tower forming game in the medal game can be played without affecting each other. Specifically, it is possible to prevent an unfinished medal tower from collapsing due to the feeding of medals and the movement of the pusher table during the medal acquisition game by playing the medal acquisition game and the medal tower forming game in different areas. Therefore, it is not necessary to stop the feeding of the medals and the movement of the pusher table in a process of forming the medal tower, and it is possible to perform the medal tower forming game in parallel with the medal acquisition game. Therefore, it is possible to shorten a waiting time for medal tower forming, to realize elimination of stress of the player due to the inability to play the medal acquisition game during the waiting time, and to play the medal game at a good tempo. At the same time, it becomes easier for the player to confirm a formed state of the medal tower and it is possible to arouse player's desire to form a higher medal tower, by making the forming of the medal tower visible from the outside of the medal game machine. As a result, it is possible to improve a degree of satisfaction of the player with the medal game and enjoyment of the medal game.

Further, in the medal game machine 1 according to the present embodiment described above, a height of the predetermined position P2 is the same as a height of the placement surface 12, and the transporter 17 can transport the medal tower from the predetermined position P2 to the placement surface 12 by horizontally moving the medal tower. As a result, it is possible to easily realize transport of the medal tower, and to maintain the medal tower in a stable state during transport.

Further, in the medal game machine 1 according to the embodiment described above, the transporter 17 includes the extruder 171 that can move horizontally back and forth between the first area F1 and the second area F2, and extrudes the medal tower to the placement surface 12 from the predetermined position P2 by coming in contact with the medal tower, the pusher table 13 can move horizontally with respect to the placement surface 12 in the first direction D1, the extruder 171 can move horizontally with respect to the placement surface 12 in the second direction D2, the first direction D1 and the second direction D2 can intersect each other, and the second area F2 can exist on one side of the first area F1 in the second direction D2. As a result, it is possible to realize transport of the medal tower by using a simple configuration, to reduce a dimension of the medal game machine in a moving direction of the pusher table as compared with a case in which the pusher table and the extruder are arranged side by side, by arranging the pusher table and the extruder so that moving directions thereof intersect, and to achieve a small size of the medal game machine.

Further, the medal game machine 1 according to the embodiment described above can further include the controller 50 configured to control the medal feeder 11 and the pusher table 13, wherein the controller 50 can enable the medal feeder 11 to feed medals into the first area F1 and the pusher table 13 to move in a process of forming the medal tower using the medal tower forming device 16, or in a state in which the medal tower is placed at the predetermined position P2, and stop the medal feeder 11 feeding the medals into the first area F1 and the movement of the pusher table 13 in a transport process in which the transporter 17 transports the medal tower formed at the predetermined position P2 to the placement surface 12. As a result, the medal pushing game can be simultaneously progressed in the process of forming the medal tower, and when the completed medal tower is transported, the collapse of the medal tower due to the progress of the medal pushing game can be avoided.

Further, in the medal game machine 1 according to the embodiment described above, the predetermined placement position P1 for placing the medal tower is formed on the placement surface 12, the transporter 17 includes the extruder 171 that pushes the medal tower from the predetermined position P2 to the placement position P1 by coming into contact with the medal tower, the medal game machine further include the controller 50 that controls the medal feeder 11 and the pusher table 13, the controller 50 stops the feeding of the medals into the first area F1 by the medal feeder 11 and/or the movement of the pusher table 13 in the transport process from a time when the extruder 171 comes into contact with one medal tower at the predetermined position P2 and starts to move the medal tower toward the placement position P1 to a time when the extruder 171 finishes moving the medal tower to the placement position P1, and an exit process from a time immediately after the transport process is performed to a time when the extruder 171 exits from the first area F1, and the extruder 171 enables the medal feeder 11 to feed medals into the first area F1 and the pusher table 13 to move in a standby state in which the extruder is located outside the first area F1 without coming into contact with the medal tower. As a result, it is possible to curb collapse of the medal tower during transport and the damage of the extruder during the exit due to the feeding of the medals, and to shorten a stop time of the medal pushing game by stopping the medal acquisition game only in the process of transporting the medal tower using the extruder and the process of exiting the extruder.

Further, in the medal game machine 1 according to the present embodiment described above, the controller 50 enables the medal feeder 11 to receive medals from the outside in the transport process and the exit process, and the controller 50 can calculate the number of medals received by the medal feeder 11 in the transport process. As a result, even when the medal pushing game is temporarily stopped, it is possible for the player to feed medals to the medal feeder 11, and to improve a degree of freedom of the player.

Further, in the medal game machine 1 according to the embodiment described above, the medal feeder 11 includes an adjustment handle 112 (feeding operator) operated by a player, a predetermined placement position P1 for placing the medal tower is formed on the placement surface 12, the transporter 17 includes an extruder 171 that pushes the medal tower from the predetermined position P2 to the placement position P1 by coming into contact with the medal tower, an exit process of exiting the extruder 171 from the first area F1 is performed immediately after the transport process is performed, and the controller 50 can control the medal feeder 11 so that the medal feeder 11 does not feed the medal into the first area F1 even when the feeding button 113 is operated in the transport process and the exit process. As a result, it is possible to reliably avoid the collapse of the medal tower due to the feeding of medals.

The present invention is not limited to each of the above embodiments, and embodiments obtained by a person skilled in the art appropriately designing and changing such embodiments are also included in the scope of the present invention as long as the embodiments have the characteristics of the present invention. That is, respective elements included in each of the embodiments, a disposition, material, condition, shape, size, and the like thereof are not limited to those exemplified and can be appropriately changed. Further, the respective elements included in each of the above embodiments can be combined if technically possible, and the combination is also included in the scope of the present invention as long as the characteristics of the present invention are included.

What is claimed is:

1. A medal game machine, comprising:

a medal feeder configured to feed medals into a first area;

a placement surface on which the medals are placed;

a pusher table configured to move the medals placed on the placement surface;

a medal supply path configured to supply medals via a separate path than the medals fed by the medal feeder;

a medal tower forming device comprising a tower placement surface and a protection portion that prevents the medals placed on the placement surface from feeding the tower placement surface, the medal tower forming device coupled to the medal supply path and configured to receive the medals from the medal supply path and form a medal tower having one or more layers at a predetermined position on the tower placement surface, wherein each of the one or more layers comprises a plurality of medals disposed in a predetermined arrangement; and a transporter configured to transport the medal tower formed at the predetermined position to the placement surface in a stable state such that the predetermined arrangement of the medal tower is maintained while the medal tower is transported, wherein the placement surface and the pusher table are located in the first area and the predetermined position is located in a second area outside the first area, wherein the placement surface and the tower placement surface are located at a same height position, and wherein the medal tower forming device forms medal towers that are visible from the outside of the medal game machine.

2. The medal game machine according to claim 1, wherein the transporter comprises an extruder configured to move between the first area and the second area, wherein the extruder is further configured to push the medal tower from the predetermined position to the placement surface by coming into contact with the medal tower, wherein the pusher table is further configured to move in a first direction with respect to the placement surface, the first direction being a longitudinal direction of the placement surface, wherein the extruder is further configured to move in a second direction with respect to the placement surface, the second direction being substantially orthogonal to the longitudinal direction of the placement surface, wherein the first direction and the second direction intersect.

3. The medal game machine according to claim 1, further comprising:

a controller configured to control the medal feeder and the pusher table, wherein the controller is configured to:

enable a feeding of the medals into the first area by the medal feeder and a movement of the pusher table during a form process in which the medal tower forming device forms the medal tower or in a state in which the medal tower is placed at the predetermined position; and stop the feeding of the medals into the first area by the medal feeder and the movement of the pusher table during a transport process in which the transporter transports the medal tower formed at the predetermined position to the placement surface.

4. The medal game machine according to claim 3, wherein the placement surface comprises a placement position for placing the medal tower, wherein the transporter comprises an extruder configured to push the medal tower from the predetermined position to the placement position by coming into contact with the medal tower, wherein the controller is further configured to:

enable the feeding of the medals into the first area by the medal feeder and the movement of the pusher table during a standby state in which the extruder is located outside the first area without contacting with the medal tower;

stop the feeding of the medals into the first area by the medal feeder and/or the movement of the pusher table during the transport process, wherein the transport process occurs from a time when the extruder comes into contact with the medal tower at the predetermined position and starts to move the medal tower toward the placement position to a time when the extruder finishes moving the medal tower to the placement position; and stop the feeding of the medals into the first area by the medal feeder and/or the movement of the pusher table during an exit process occurring from a time immediately after the transport process is performed to a time when the extruder exits from the first area.

5. The medal game machine according to claim 4, wherein the controller is further configured to:

enable the medal feeder to receive medals supplied from the outside of the medal game machine during the transport process and the exit process; and calculate the number of medals received by the medal feeder during the transport process.

6. The medal game machine according to claim 5, wherein the medal feeder comprises a feeding operator operated by a player, and wherein the controller is further configured to control the medal feeder so that the medal feeder does not feed the medals into the first area when the feeding operator is operated during the transport process and the exit process.

* * * * *